United States Patent
Yi et al.

(10) Patent No.: US 10,945,195 B2
(45) Date of Patent: *Mar. 9, 2021

(54) METHOD AND APPARATUS FOR CONFIGURING BANDWIDTH INCLUDING DIRECT CURRENT SUBCARRIER FOR LOW COST USER EQUIPMENT IN WIRELESS COMMUNICATION SYSTEM

(71) Applicant: LG ELECTRONICS INC., Seoul (KR)

(72) Inventors: Yunjung Yi, Seoul (KR); Kijun Kim, Seoul (KR); Sukhyon Yoon, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/518,991

(22) Filed: Jul. 23, 2019

(65) Prior Publication Data

US 2019/0364490 A1 Nov. 28, 2019

Related U.S. Application Data

(63) Continuation of application No. 15/510,174, filed as application No. PCT/KR2015/009837 on Sep. 18, 2015, now Pat. No. 10,412,664.

(Continued)

(51) Int. Cl.
*H04W 56/00* (2009.01)
*H04W 48/12* (2009.01)
(Continued)

(52) U.S. Cl.
CPC ............... *H04W 48/12* (2013.01); *H04L 5/00* (2013.01); *H04L 5/0042* (2013.01);
(Continued)

(58) Field of Classification Search
CPC ............ H04W 48/12; H04W 52/0216; H04W 52/0229; H04W 72/042; H04W 72/0453;
(Continued)

(56) References Cited

U.S. PATENT DOCUMENTS

2012/0320848 A1 12/2012 Chen et al.
2013/0089067 A1* 4/2013 Ji ....................... H04W 72/042
370/330

(Continued)

FOREIGN PATENT DOCUMENTS

WO 2014006498 1/2014
WO 2014049326 4/2014

OTHER PUBLICATIONS

Non-Final Office Action dated Sep. 19, 2018 in U.S. Appl. No. 15/510,404.

(Continued)

*Primary Examiner* — Sai Ming Chan
(74) *Attorney, Agent, or Firm* — Lee Hong Degerman Kang Waimey

(57) ABSTRACT

A method and apparatus for allocating resources to a low cost user equipment (UE) in a wireless communication system is provided. A base station (BS) allocates resource blocks including a punctured direct current (DC) subcarrier to a low cost UE, and communicating with the low cost UE by using the allocated resource blocks. The allocated resource blocks may not be located at center of a set of resource blocks that the low cost UE can access at a given subframe.

15 Claims, 26 Drawing Sheets

Related U.S. Application Data

(60) Provisional application No. 62/053,213, filed on Sep. 21, 2014, provisional application No. 62/054,987, filed on Sep. 25, 2014, provisional application No. 62/067,970, filed on Oct. 23, 2014, provisional application No. 62/101,390, filed on Jan. 9, 2015, provisional application No. 62/115,148, filed on Feb. 12, 2015, provisional application No. 62/143,807, filed on Apr. 7, 2015, provisional application No. 62/153,494, filed on Apr. 27, 2015, provisional application No. 62/166,641, filed on May 26, 2015, provisional application No. 62/052,439, filed on Sep. 18, 2014.

(51) Int. Cl.
  *H04W 72/04* (2009.01)
  *H04W 52/02* (2009.01)
  *H04L 5/00* (2006.01)
  *H04W 4/70* (2018.01)

(52) U.S. Cl.
  CPC .......... *H04L 5/0044* (2013.01); *H04L 5/0053* (2013.01); *H04W 52/0216* (2013.01); *H04W 52/0229* (2013.01); *H04W 72/042* (2013.01); *H04W 72/048* (2013.01); *H04W 72/0453* (2013.01); *H04W 4/70* (2018.02); *Y02D 30/70* (2020.08)

(58) Field of Classification Search
  CPC ...... H04W 72/048; H04L 5/00; H04L 5/0042; H04L 5/0044; H04L 5/0053
  USPC ........................................................ 370/254
  See application file for complete search history.

(56) References Cited

U.S. PATENT DOCUMENTS

| | | |
|---|---|---|
| 2013/0100899 A1 | 4/2013 | Kim et al. |
| 2013/0322363 A1 | 12/2013 | Chen et al. |
| 2016/0044642 A1* | 2/2016 | Xu .................. H04L 5/0096 370/329 |
| 2017/0196019 A1 | 7/2017 | Kim .................. H04W 74/002 |
| 2017/0230948 A1* | 8/2017 | Chen .................. H04L 1/1812 |

OTHER PUBLICATIONS

3rd Generation Partnership Project (3GPP), "Technical Specification Group Radio Access Network; Study on provision of low-cost Machine-Type Communications (MTC) User Equipments (UEs) based on LTE (Release 12)," 3GPP TR 36.888 V12.0.0, Jun. 2013, 57 pages.

PCT International Application No. PCT/KR2015/009837, Written Opinion of the International Searching Authority dated Feb. 23, 2016, 2 pages.

* cited by examiner

[Fig. 1]
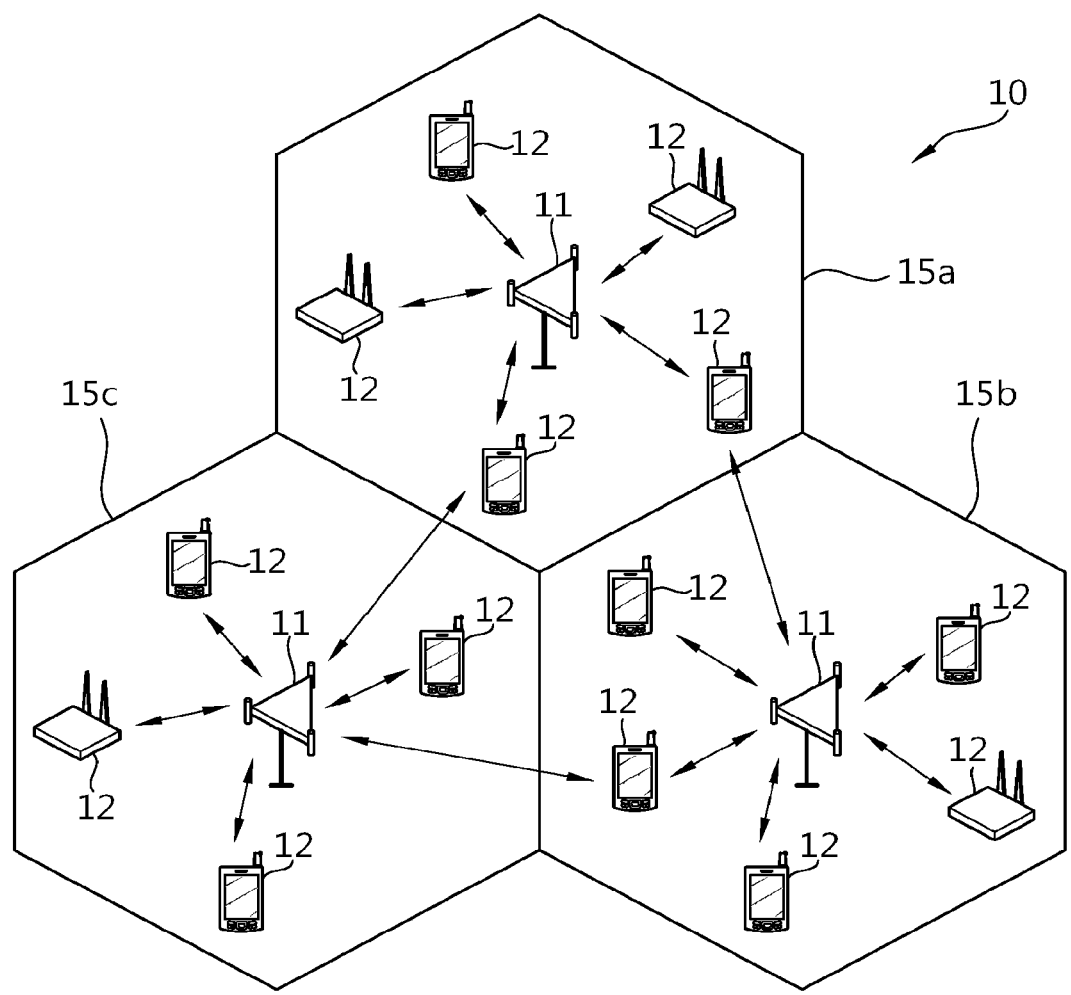
[Fig. 2]
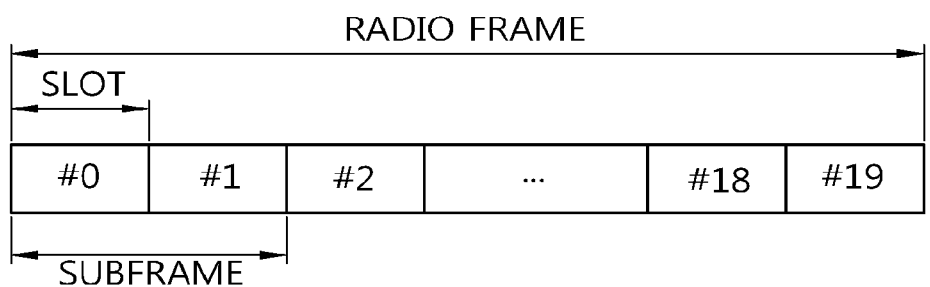

[Fig. 3]
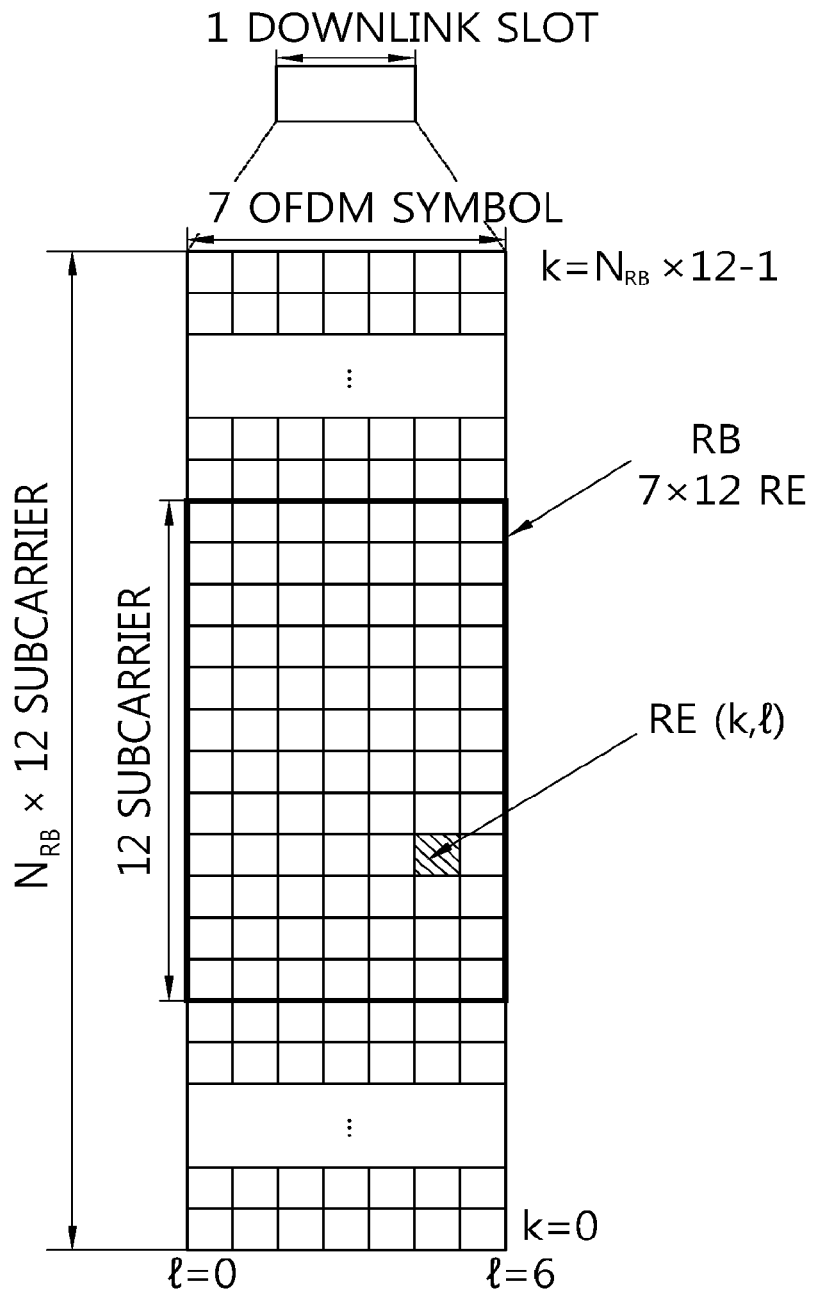

[Fig. 4]
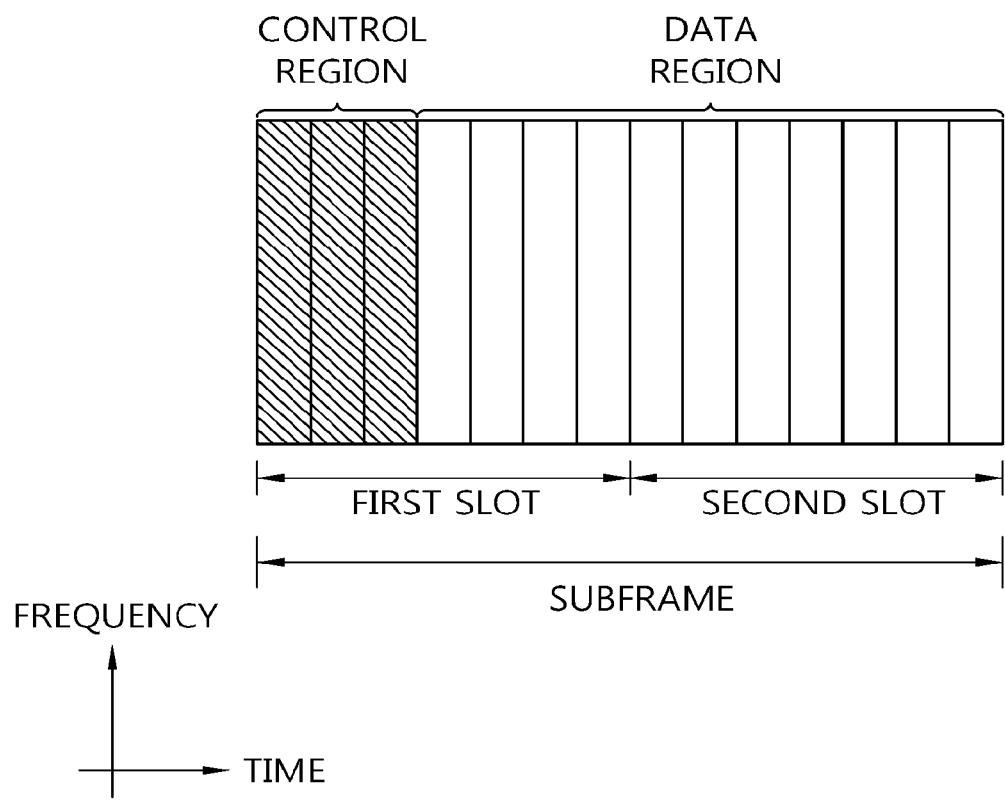

[Fig. 5]
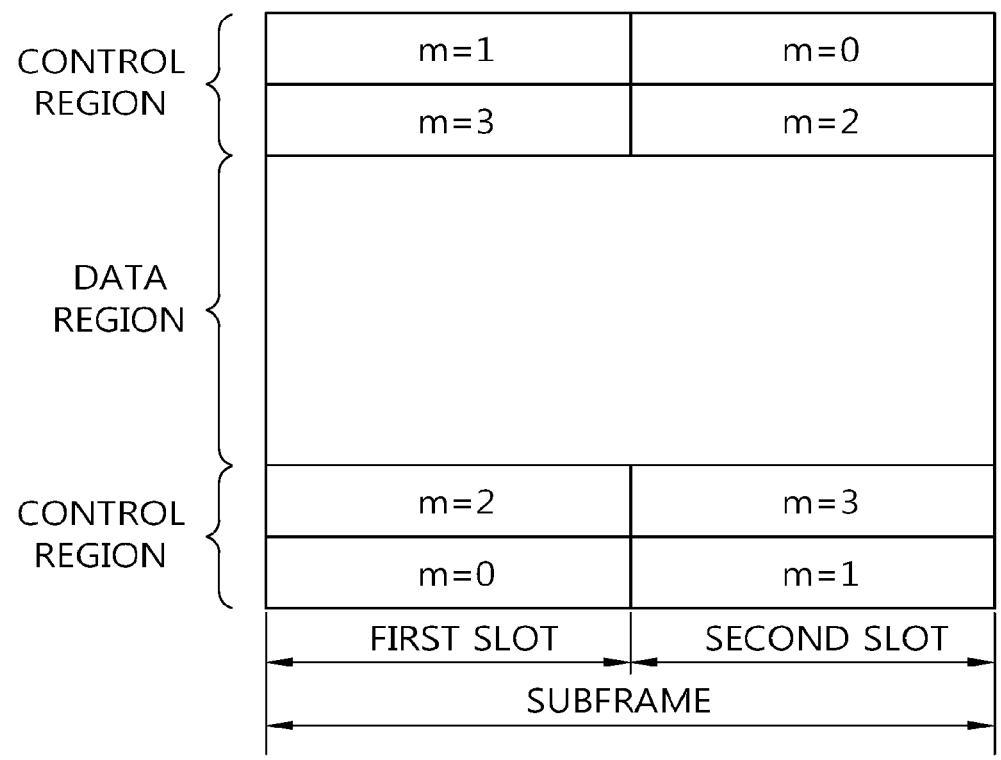
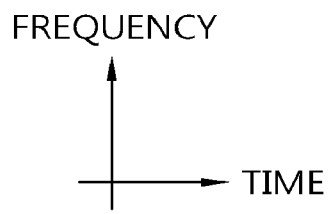

[Fig. 6]
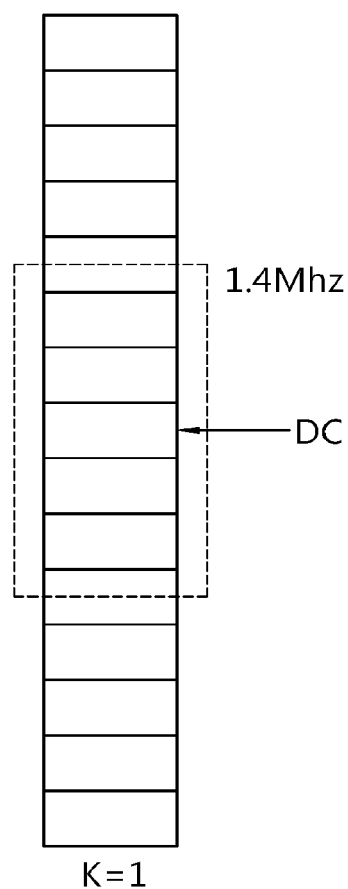

[Fig. 7]
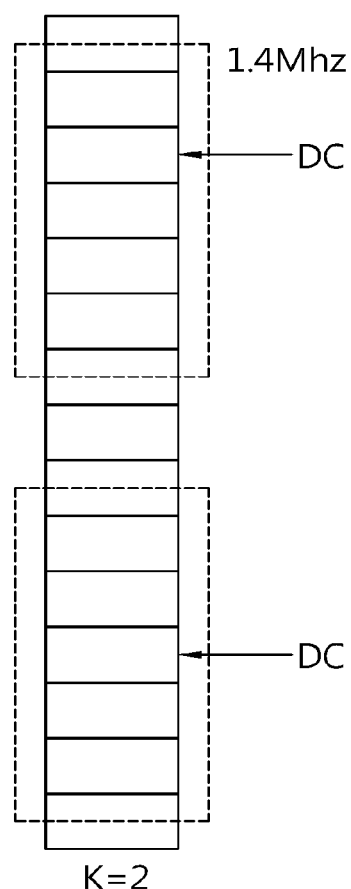

[Fig. 8]
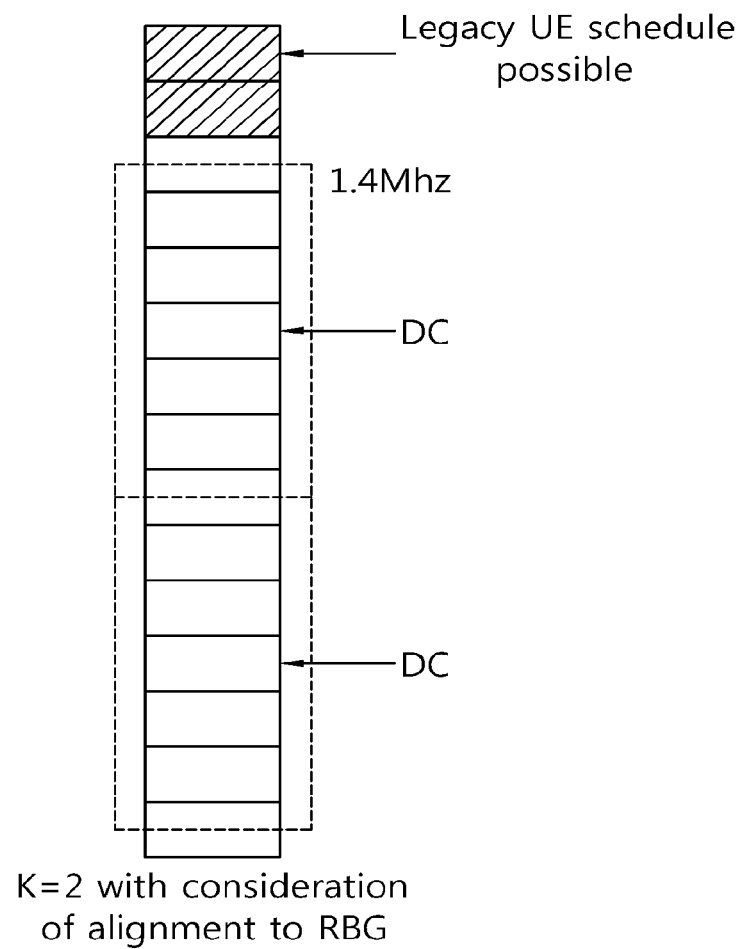

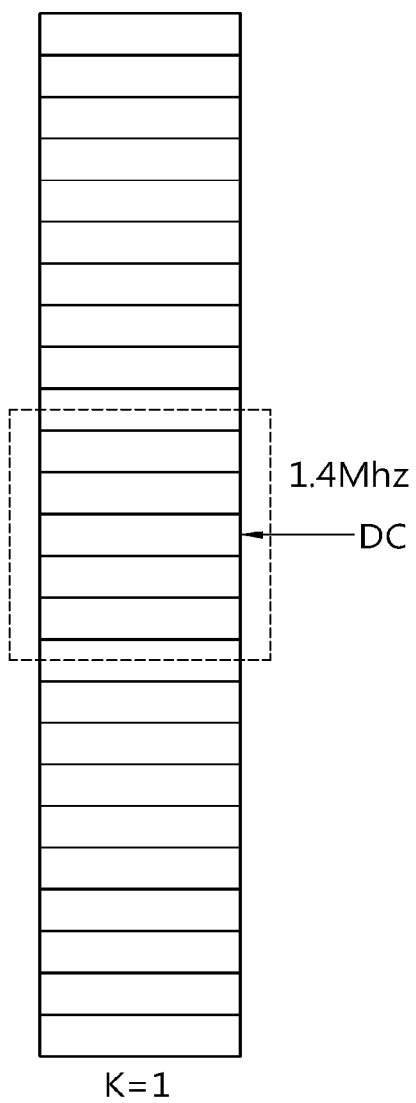
[Fig. 9]

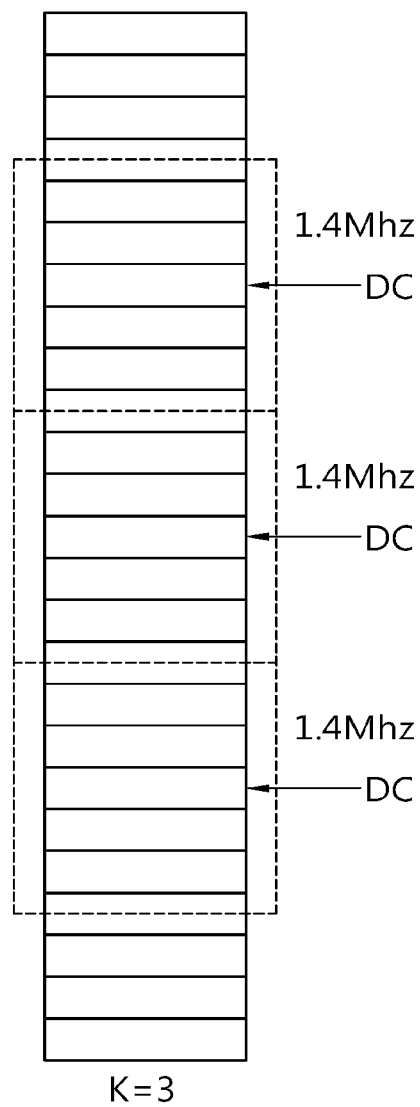
[Fig. 10]

[Fig. 11]
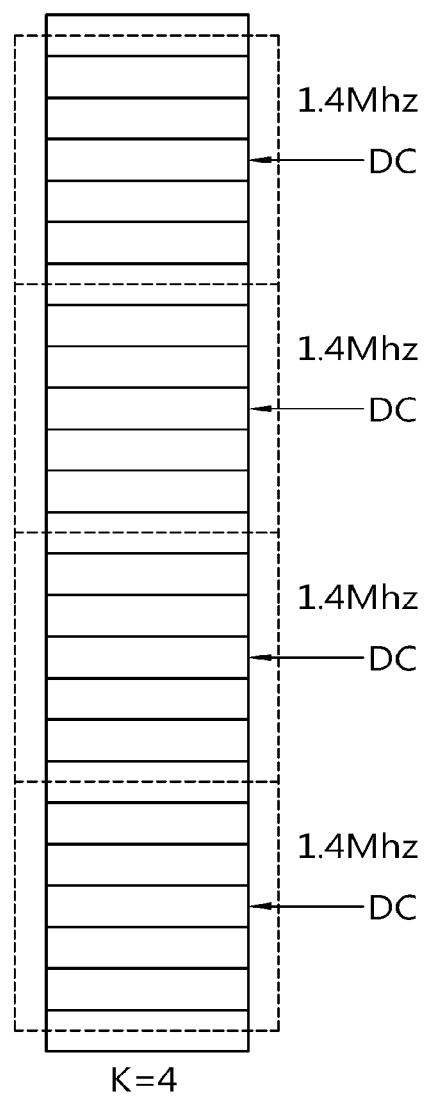
K=4

[Fig. 12]
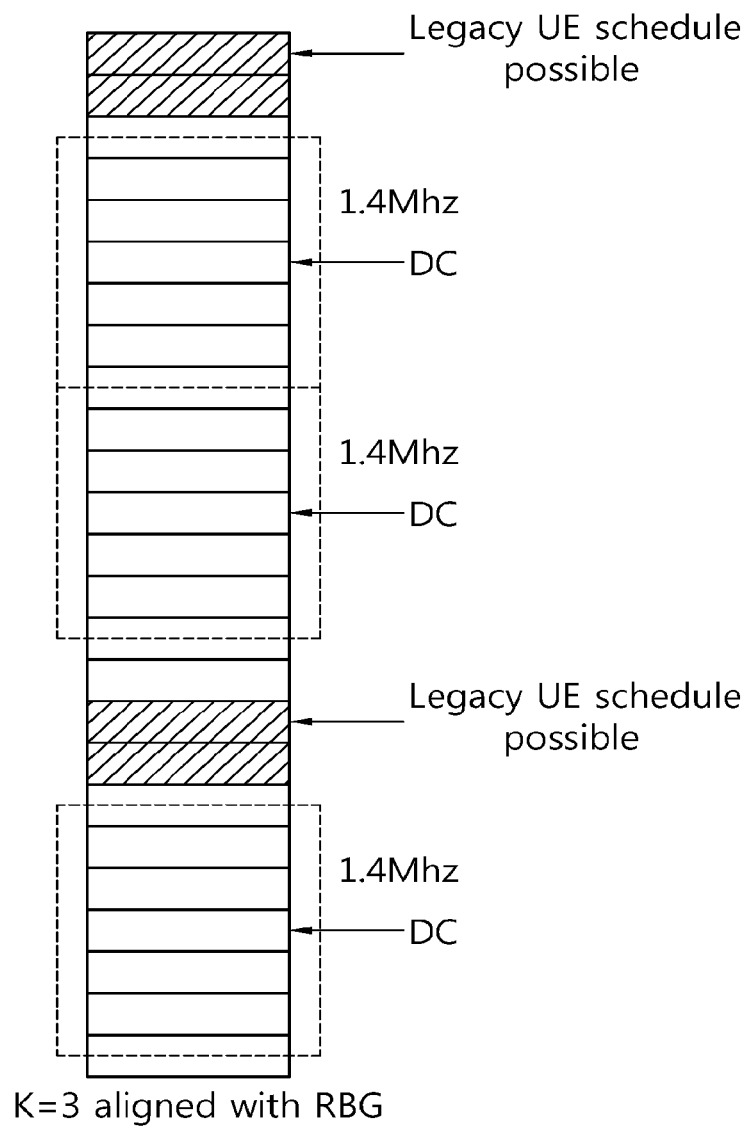
K=3 aligned with RBG

[Fig. 13]
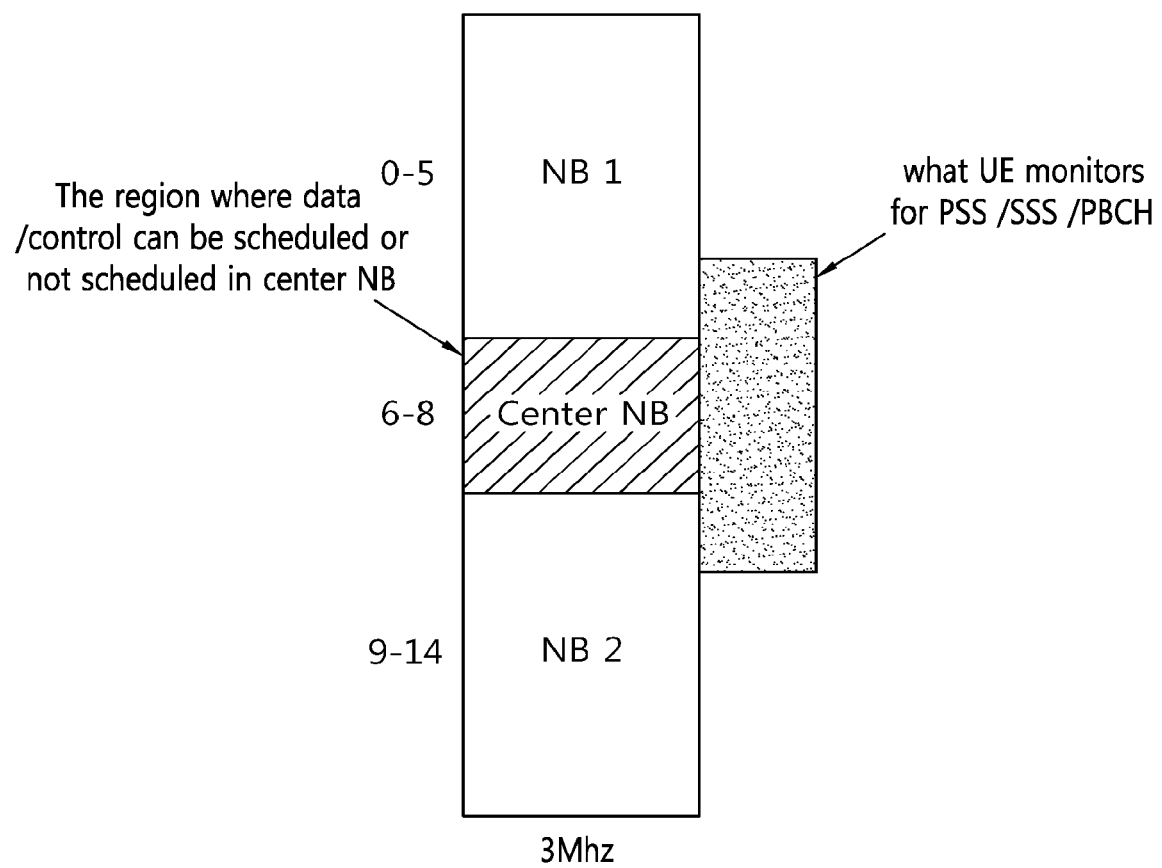

[Fig. 14]
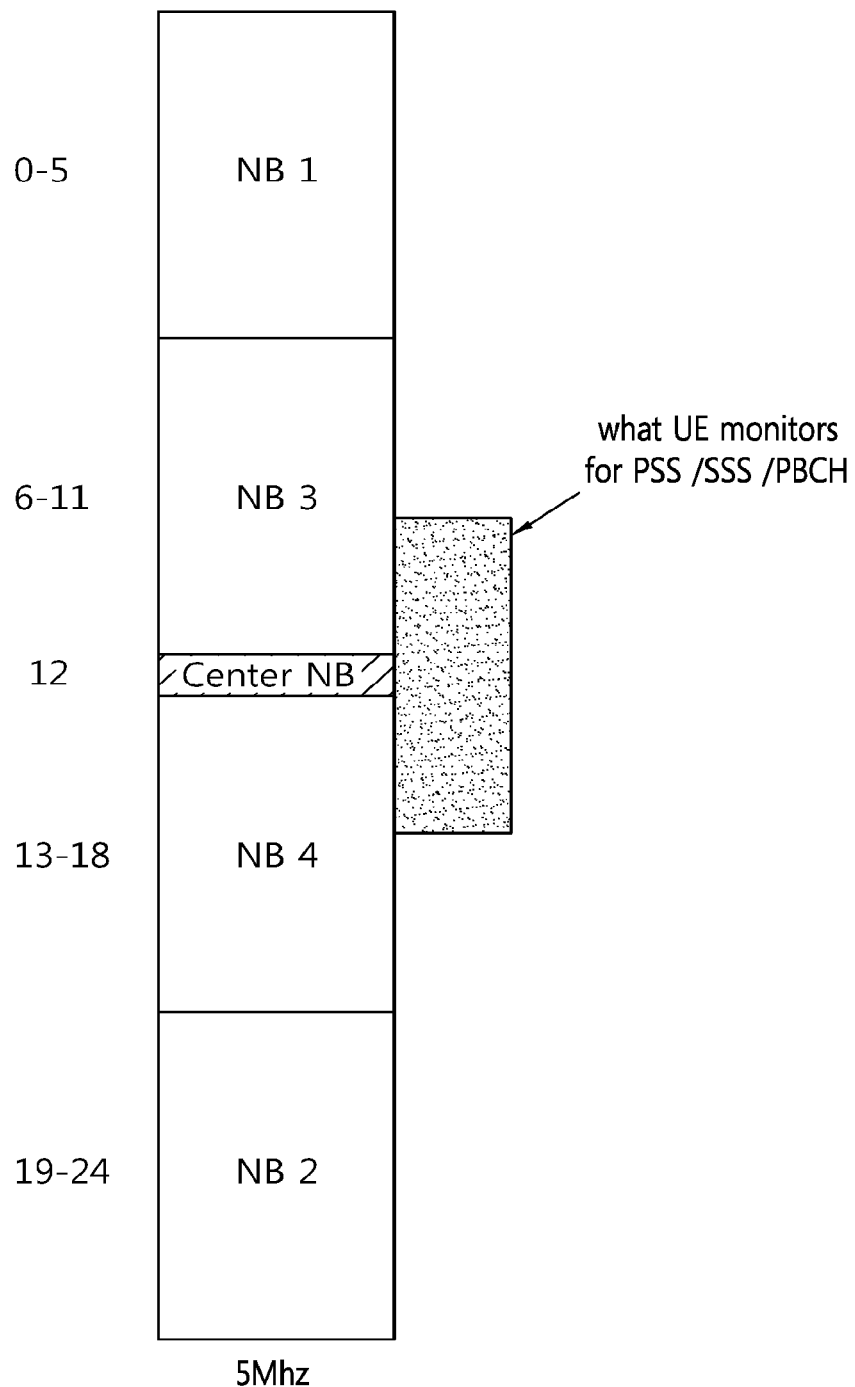

[Fig. 15]
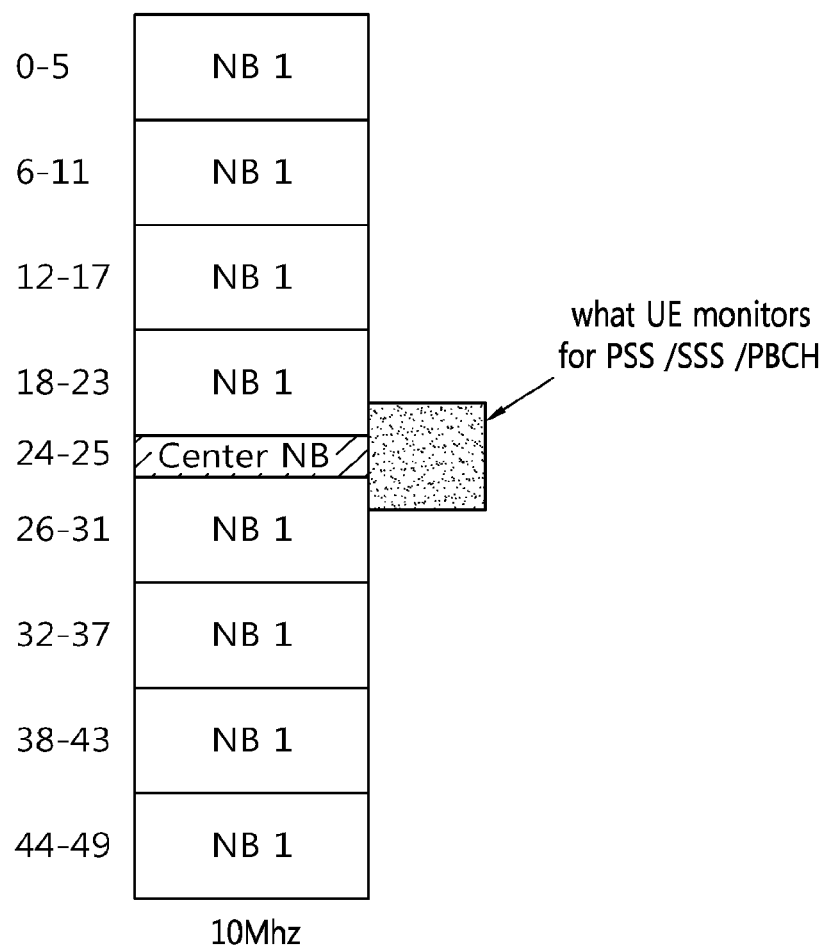

[Fig. 16]
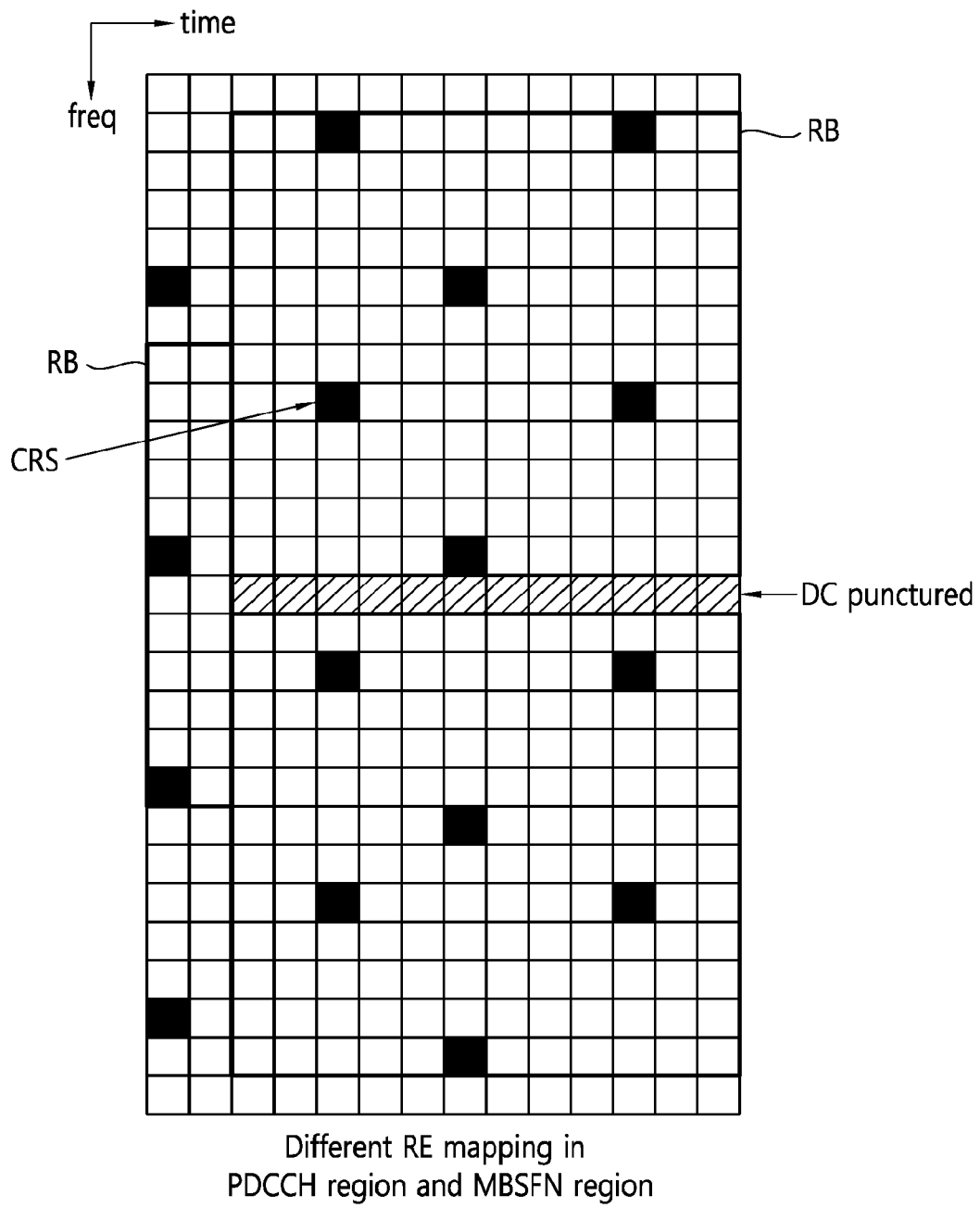
Different RE mapping in
PDCCH region and MBSFN region

[Fig. 17]
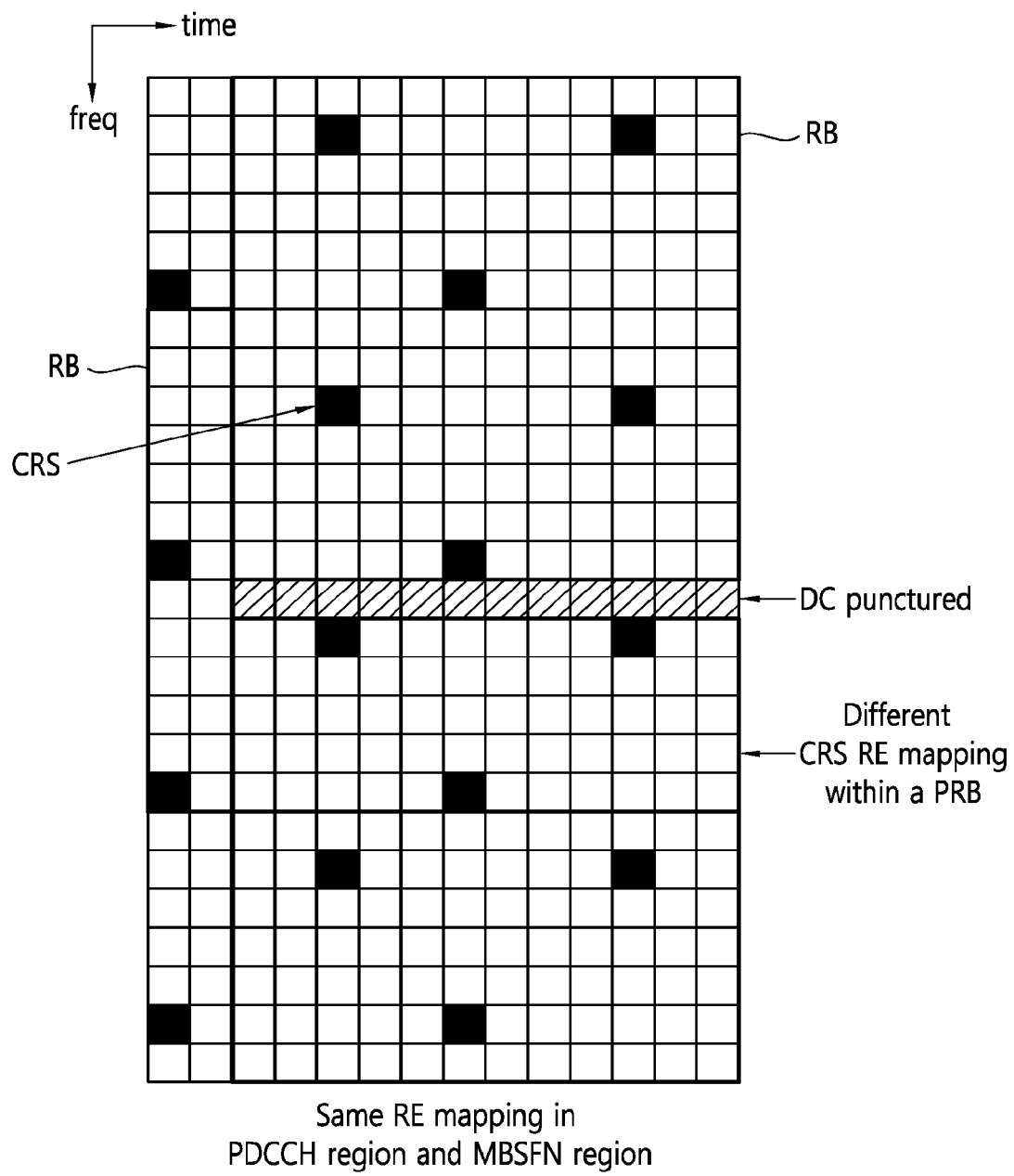
Same RE mapping in
PDCCH region and MBSFN region

[Fig. 18]
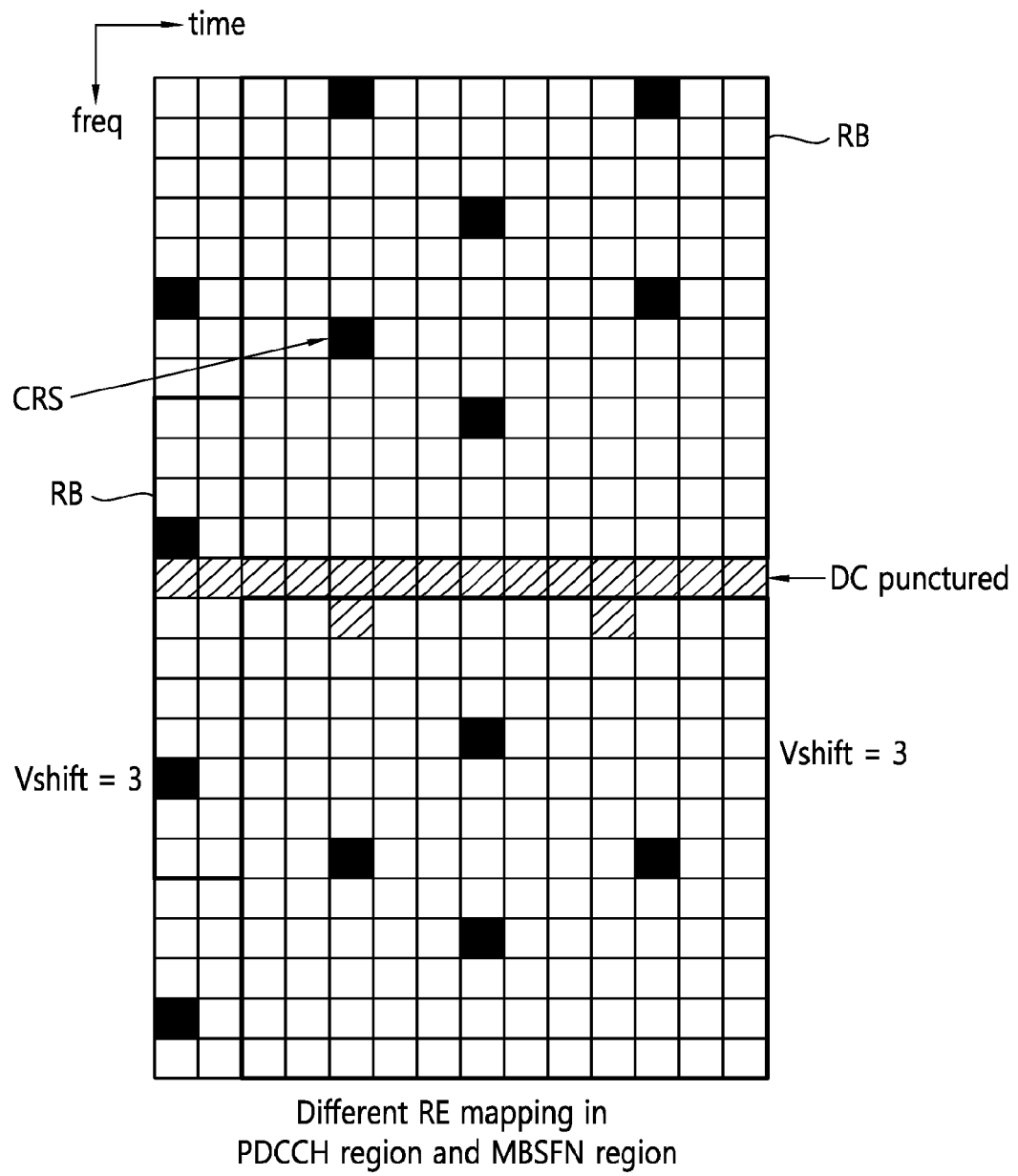
Different RE mapping in
PDCCH region and MBSFN region

[Fig. 19]
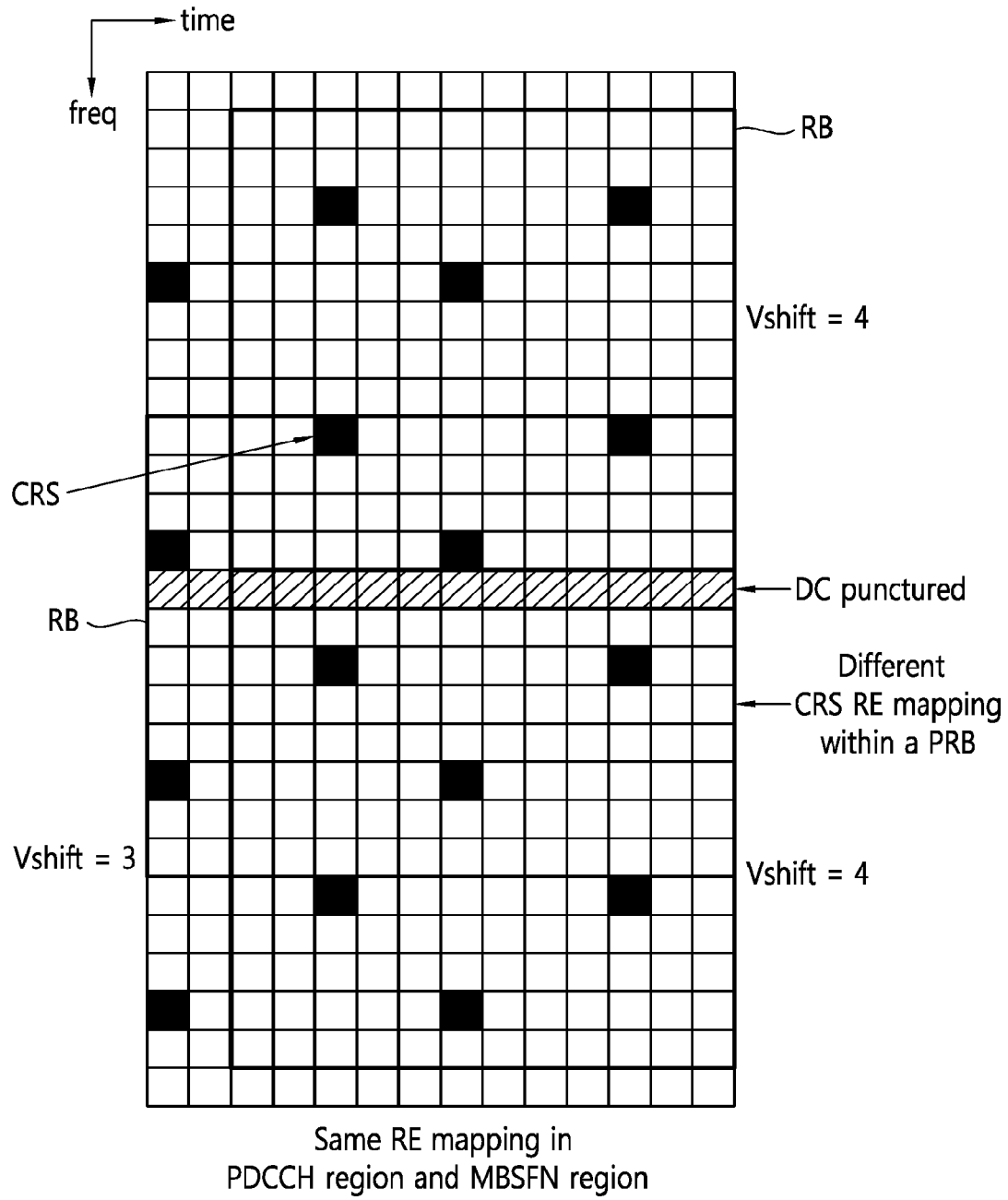

[Fig. 20]
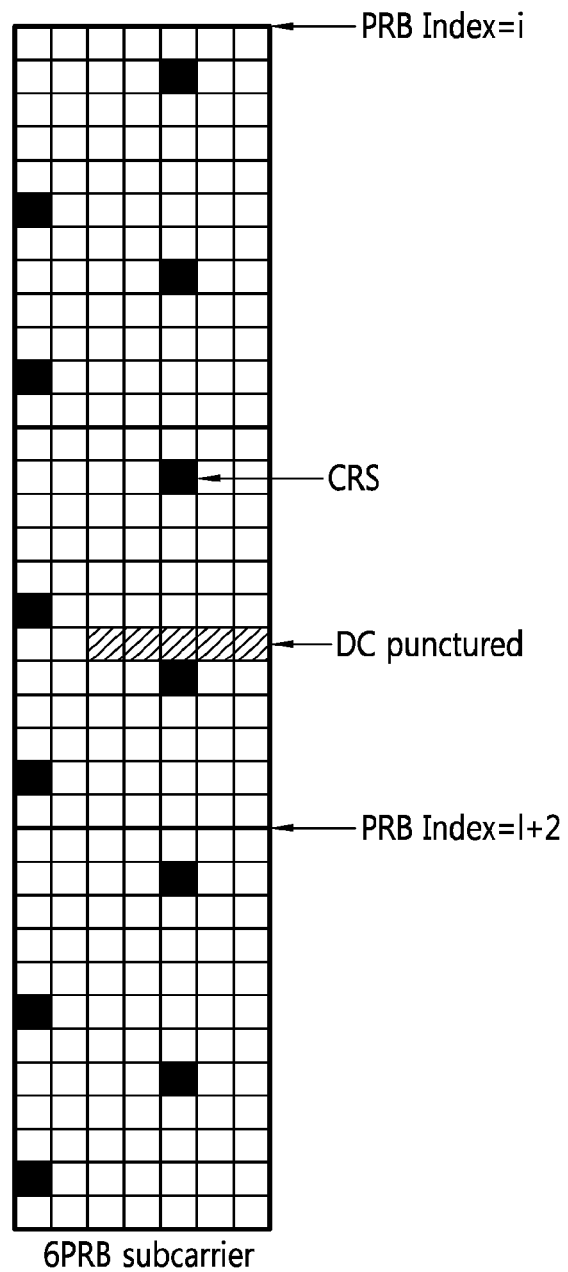

[Fig. 21]
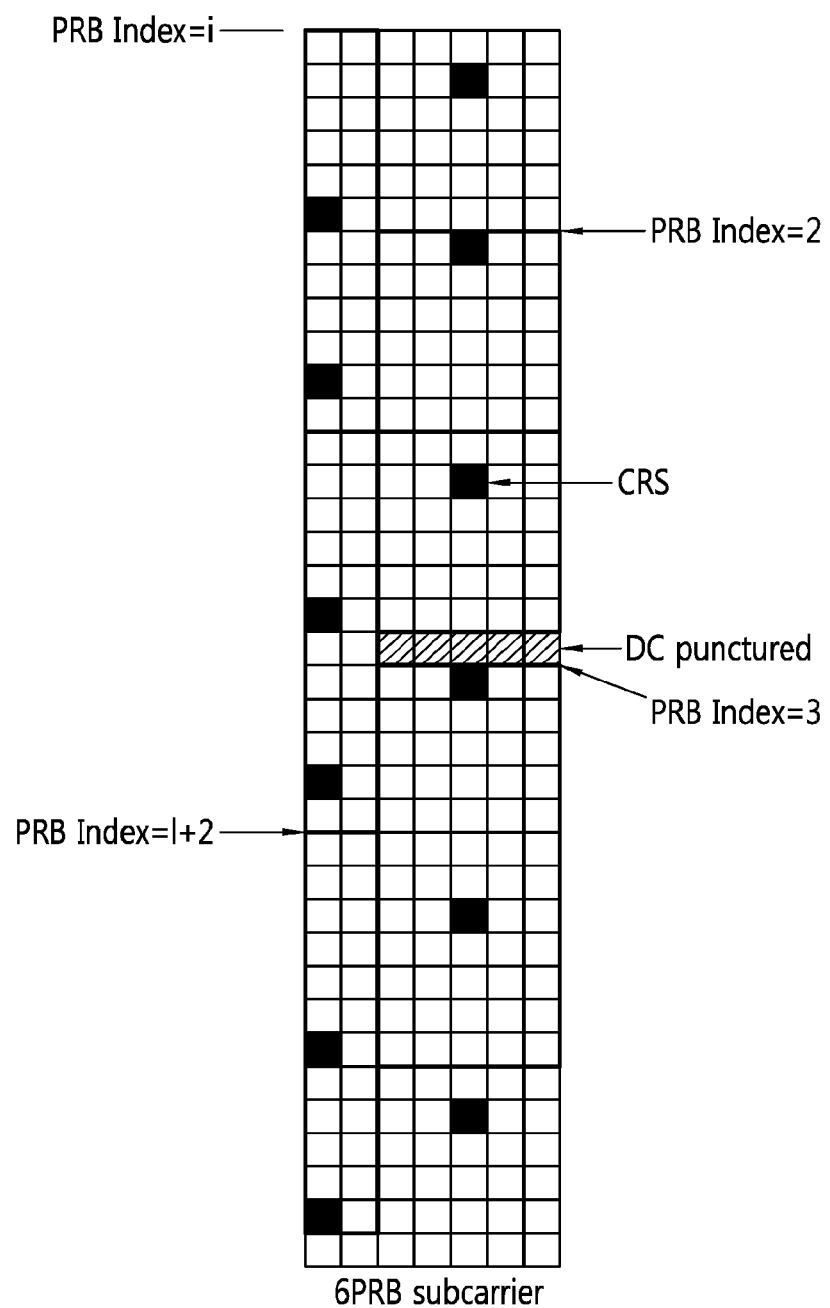

[Fig. 22]
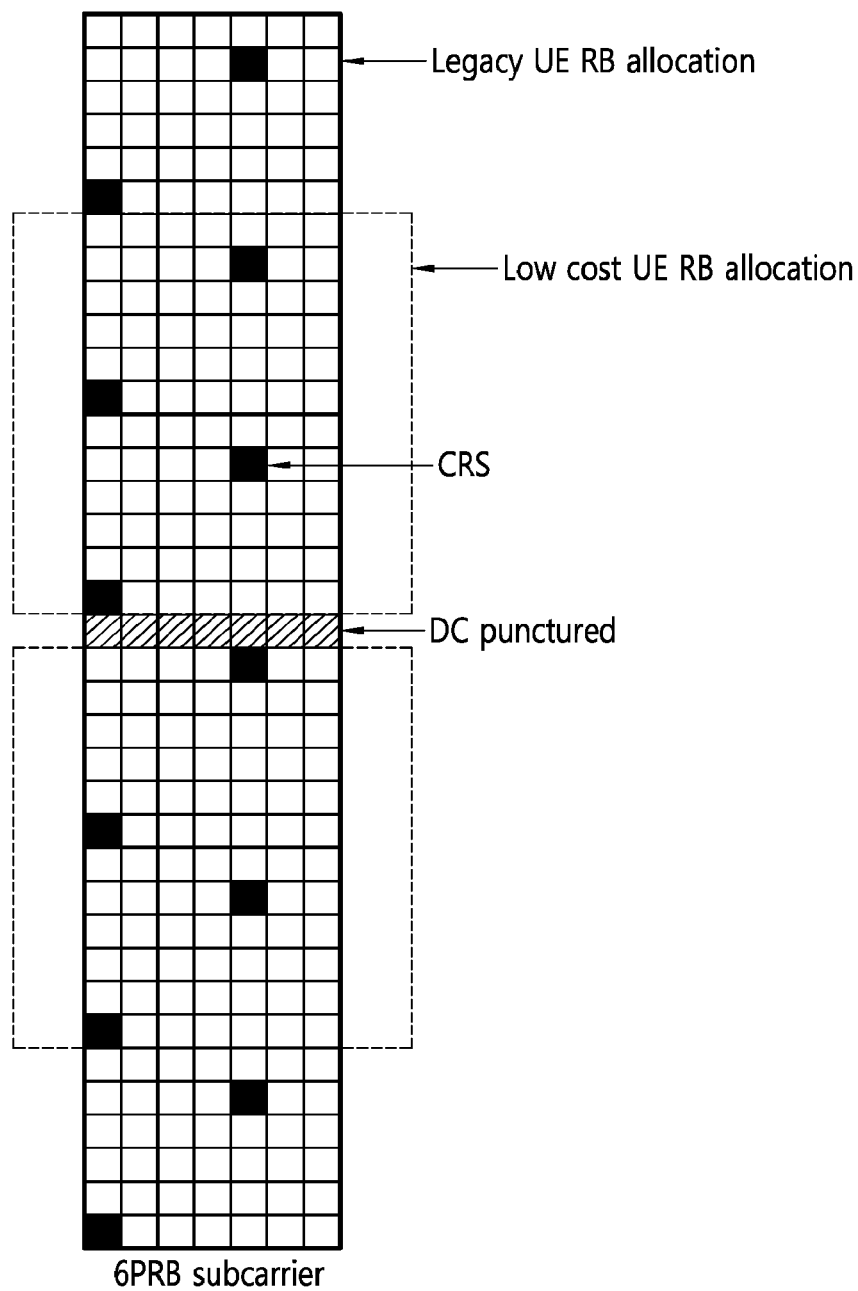
6PRB subcarrier

[Fig. 23]
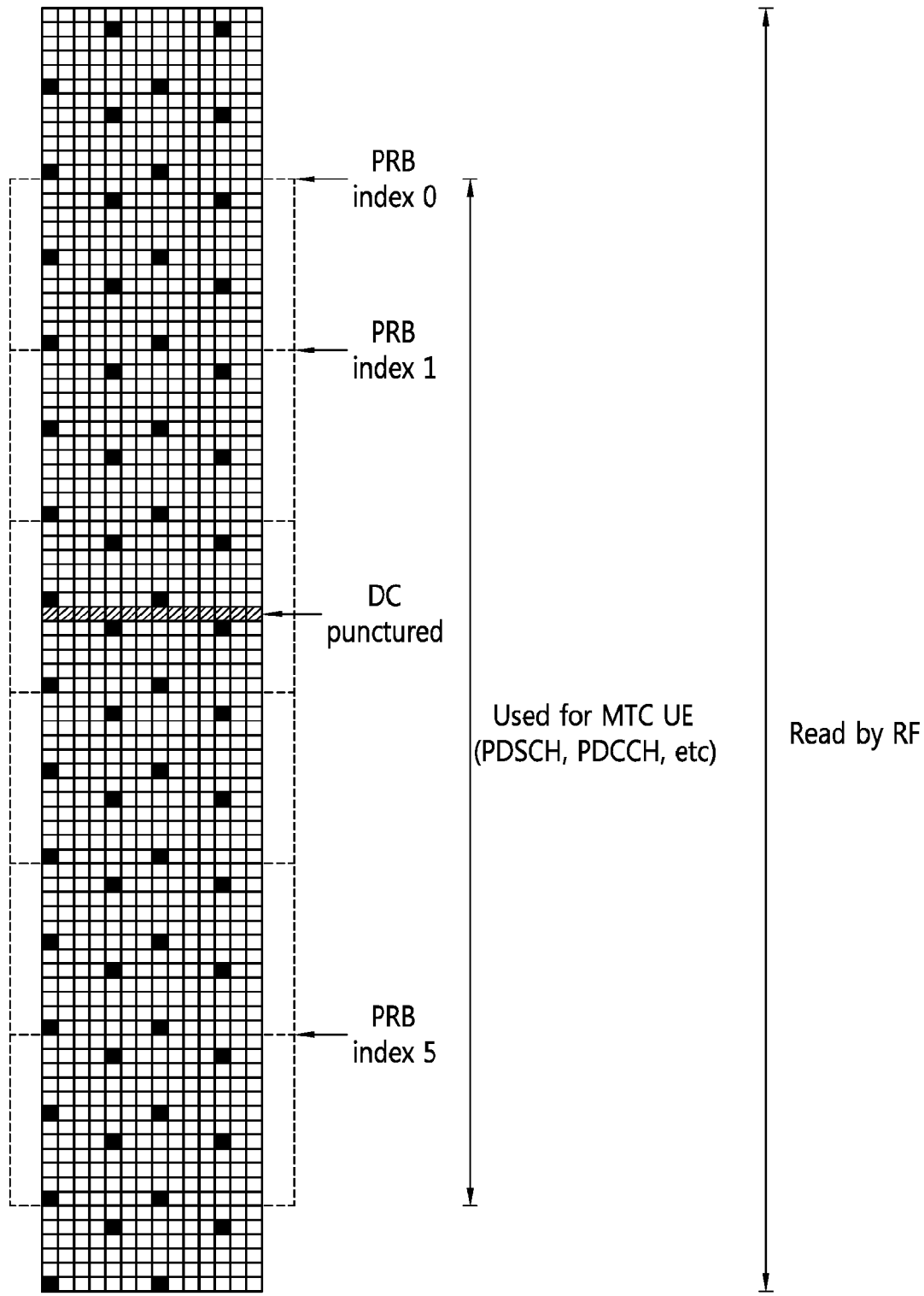

[Fig. 24]
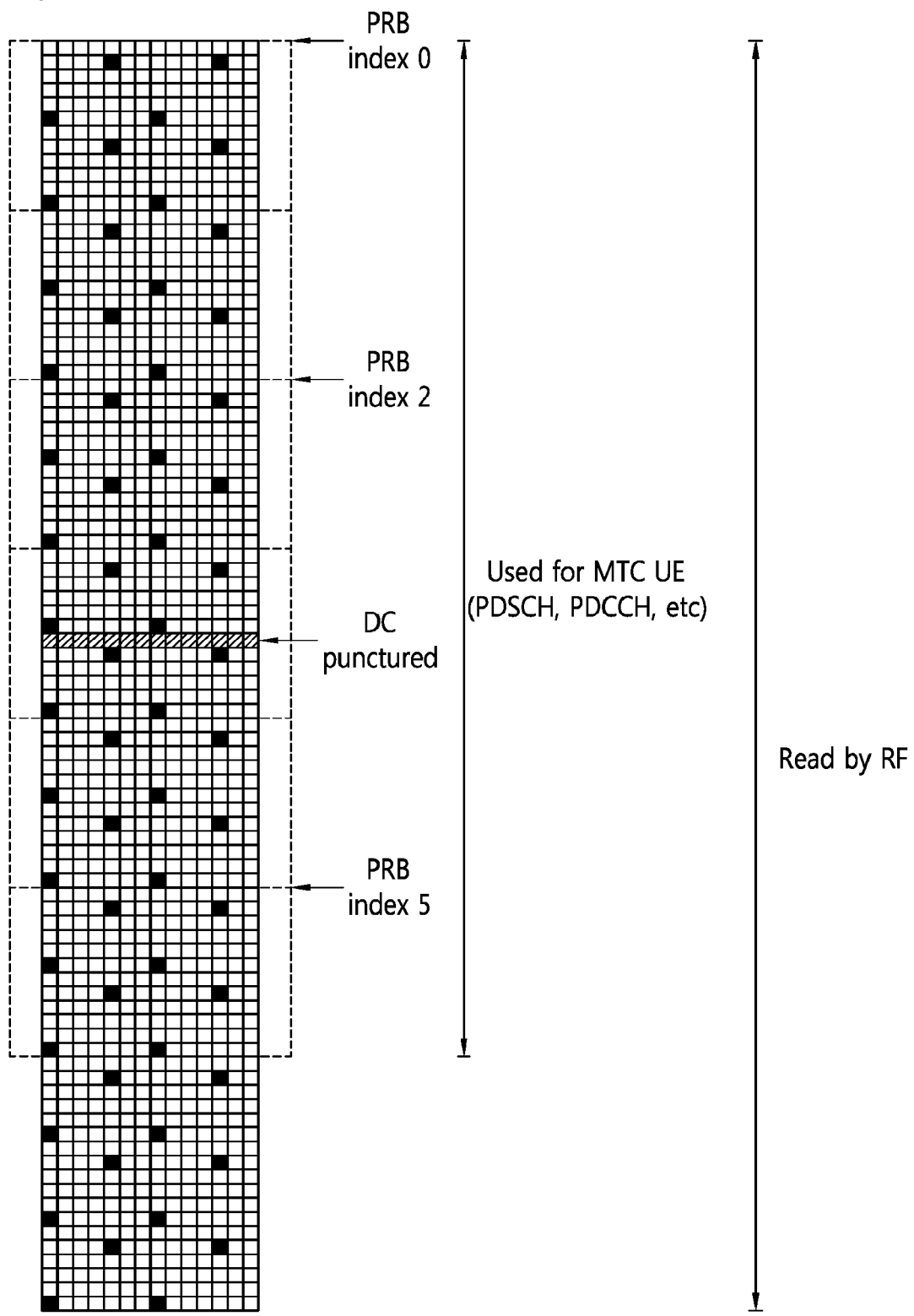

[Fig. 25]
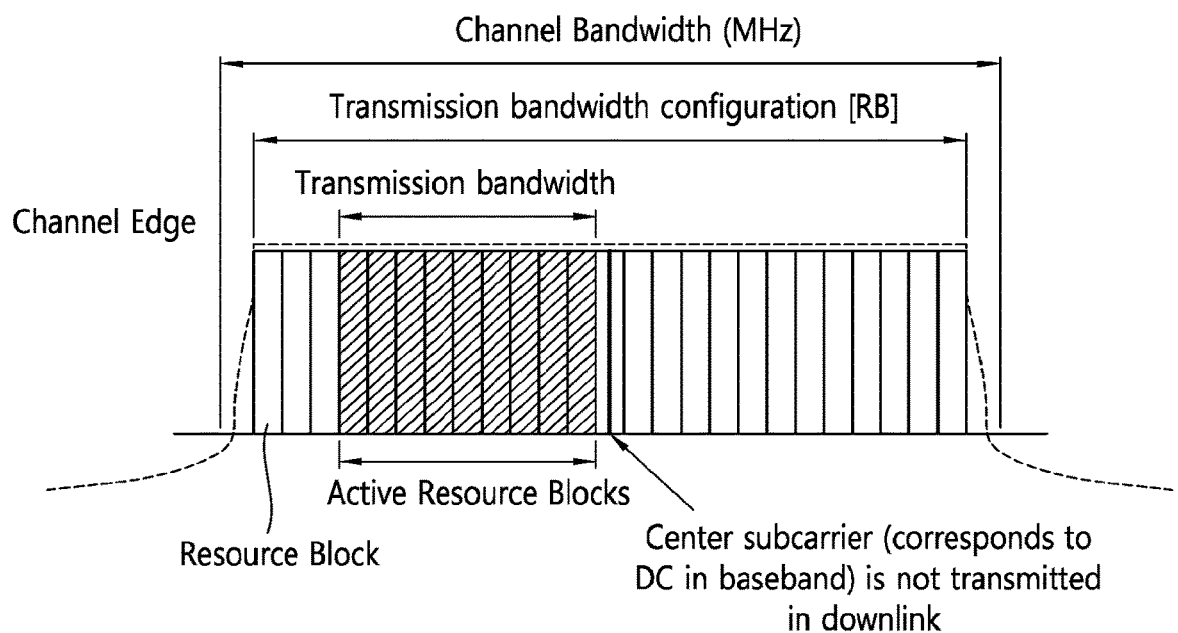

[Fig. 26]
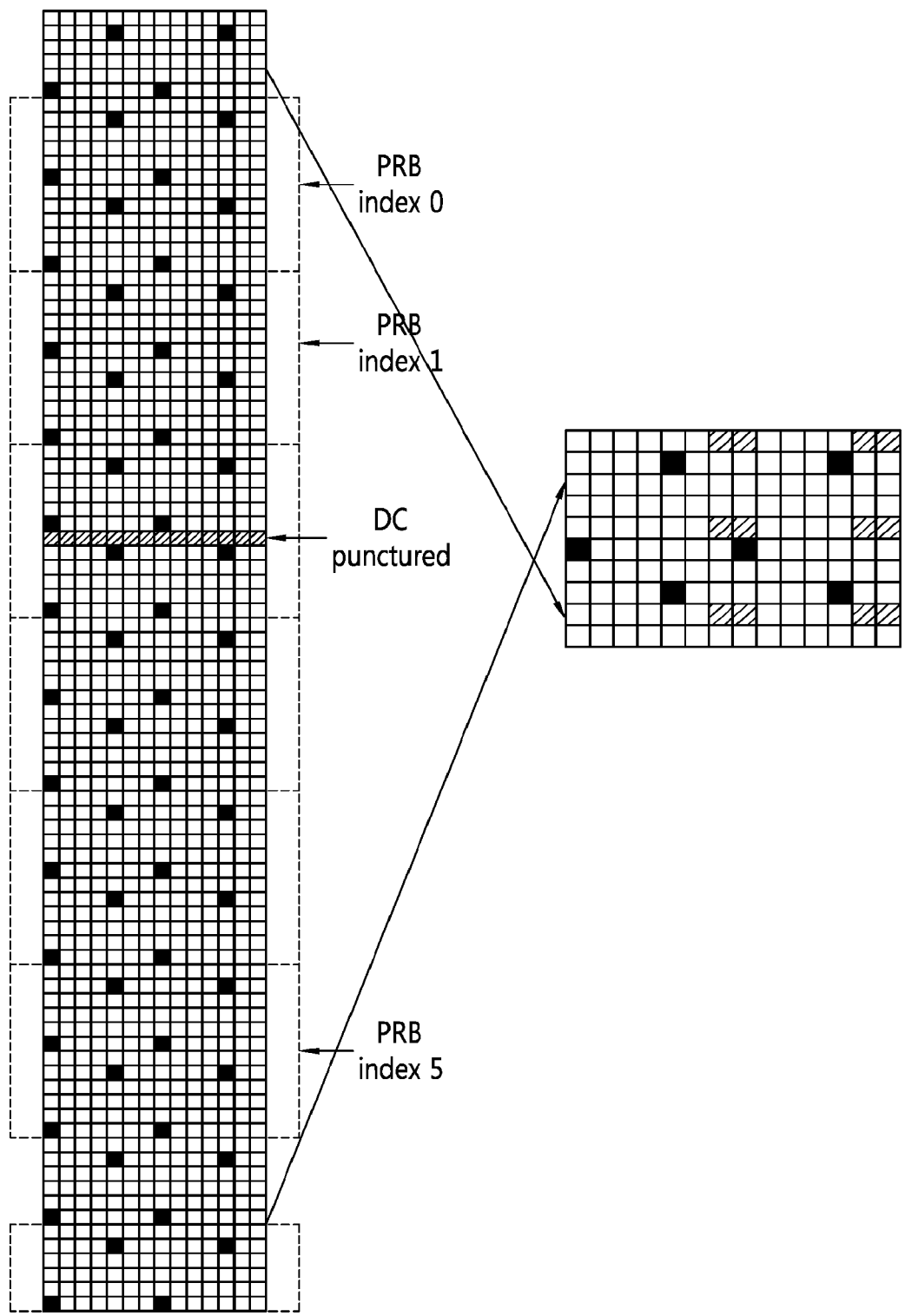

[Fig. 27]
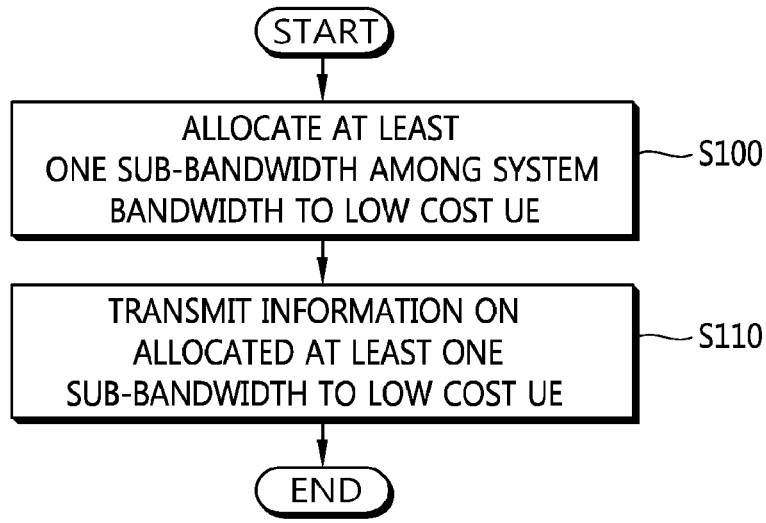
[Fig. 28]
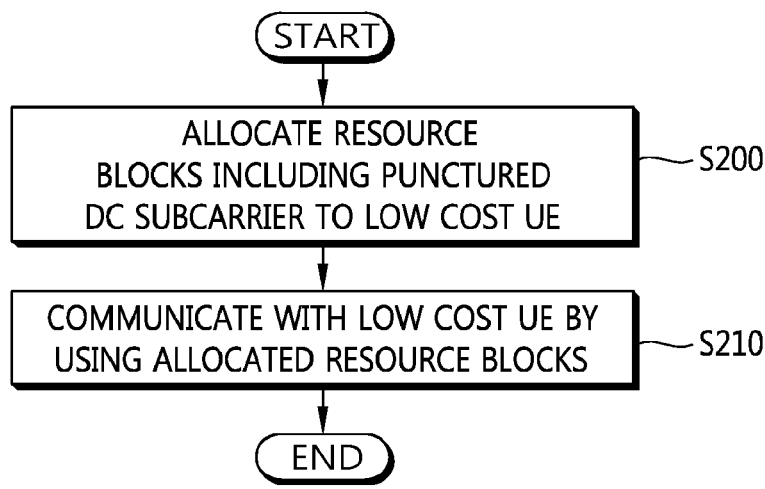
[Fig. 29]
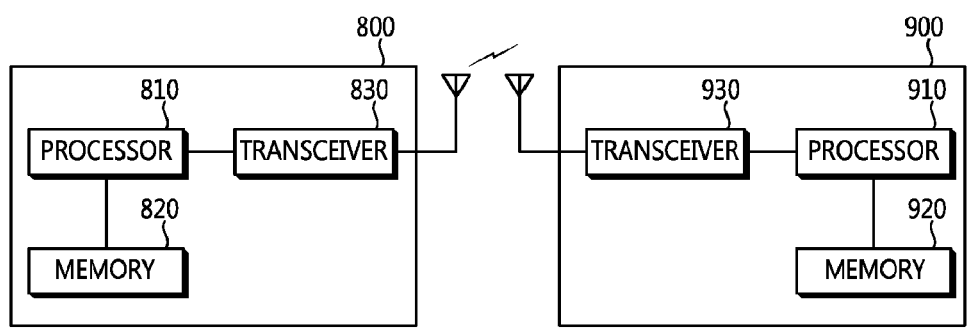

METHOD AND APPARATUS FOR CONFIGURING BANDWIDTH INCLUDING DIRECT CURRENT SUBCARRIER FOR LOW COST USER EQUIPMENT IN WIRELESS COMMUNICATION SYSTEM

CROSS-REFERENCE TO RELATED APPLICATIONS

This application is a continuation of U.S. application Ser. No. 15/510,174, filed on Mar. 9, 2017, now U.S. Pat. No. 10,412,664, which is the National Stage filing under 35 U.S.C. 371 of International Application No. PCT/KR2015/009837, filed on Sep. 18, 2015, which claims the benefit of U.S. Provisional Application Nos. 62/052,439, filed on Sep. 18, 2014, 62/053,213, filed on Sep. 21, 2014, 62/054,987, filed on Sep. 25, 2014, 62/067,970, filed on Oct. 23, 2014, 62/101,390, filed on Jan. 9, 2015, 62/115,148, filed on Feb. 12, 2015, 62/143,807, filed on Apr. 7, 2015, 62/153,494, filed on Apr. 27, 2015, and 62/166,641, filed on May 26, 2015, the contents of which are all hereby incorporated by reference herein in their entirety.

BACKGROUND OF THE INVENTION

Field of the Invention

The present invention relates to wireless communications, and more particularly, to a method and apparatus for configuring a bandwidth including a direct current (DC) subcarrier for a low cost user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Accordingly, a method for supporting a base station, which operates in relatively wider bandwidth with conventional UEs, to perform data transmission/reception with the MTC UE, which operates in a narrower bandwidth, may be required.

SUMMARY OF THE INVENTION

The present invention provides a method and apparatus for using a smaller bandwidth for a low cost user equipment (UE) in a wireless communication system. The present invention discusses how to create/handle a UE with limited radio frequency (RF) capability to receive downlink data successfully serviced by a wideband system bandwidth network. The present invention provides a method and apparatus for determining which part of system bandwidth is accessible by a low cost UE. The present invention provides a method and apparatus for allocating resource blocks for a UE with reduced bandwidth.

In an aspect, a method for allocating, by a base station (BS), resources to a low cost user equipment (UE) in a wireless communication system is provided. The method includes allocating resource blocks including a punctured direct current (DC) subcarrier to a low cost UE, and communicating with the low cost UE by using the allocated resource blocks.

In another aspect, a base station (BS) includes a memory, a transceiver, and a processor coupled to the memory and the transceiver, and configured to allocate resource blocks including a punctured direct current (DC) subcarrier to a low cost user equipment (UE), and control the transceiver to communicate with the low cost UE by using the allocated resource blocks.

Low cost UE can be supported efficiently.

BRIEF DESCRIPTION OF THE DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a set of PRBs accessible by a low cost UE according to an embodiment of the present invention.
FIG. 7 shows another example of a set of PRBs accessible by a low cost UE according to an embodiment of the present invention.
FIG. 8 shows another example of a set of PRBs accessible by a low cost UE according to an embodiment of the present invention.
FIG. 9 shows another example of a set of PRBs accessible by a low cost UE according to an embodiment of the present invention.
FIG. 10 shows another example of a set of PRBs accessible by a low cost UE according to an embodiment of the present invention.
FIG. 11 shows another example of a set of PRBs accessible by a low cost UE according to an embodiment of the present invention.
FIG. 12 shows another example of a set of PRBs accessible by a low cost UE according to an embodiment of the present invention.
FIG. 13 shows an example of a center narrowband according to an embodiment of the present invention.
FIG. 14 shows another example of a center narrowband according to an embodiment of the present invention.
FIG. 15 shows another example of a center narrowband according to an embodiment of the present invention.
FIG. 16 shows an example of CRS RE mapping to subDLBW other than center 6 PRBs according to an embodiment of the present invention.
FIG. 17 shows another example of CRS RE mapping to subDLBW other than center 6 PRBs according to an embodiment of the present invention.

FIG. 18 shows an example of Vshift for CRS depending on a DC subcarrier according to an embodiment of the present invention.

FIG. 19 shows another example of Vshift for CRS depending on a DC subcarrier according to an embodiment of the present invention.

FIG. 20 shows an example of a RB allocation with artificial DC subcarrier according to an embodiment of the present invention.

FIG. 21 shows another example of a RB allocation with artificial DC subcarrier according to an embodiment of the present invention.

FIG. 22 shows another example of a RB allocation with artificial DC subcarrier according to an embodiment of the present invention.

FIG. 23 shows another example of a RB allocation with artificial DC subcarrier according to an embodiment of the present invention.

FIG. 24 shows another example of a RB allocation with artificial DC subcarrier according to an embodiment of the present invention.

FIG. 25 shows an example of relationship between channel bandwidth and transmission bandwidth.

FIG. 26 shows an example of fragmented segments according to an embodiment of the present invention.

FIG. 27 shows an example of a method for allocating resources to a low cost UE according to an embodiment of the present invention.

FIG. 28 shows another example of a method for allocating resources to a low cost UE according to an embodiment of the present invention.

FIG. 29 shows a wireless communication system to implement an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification.

Hereinafter, a method for supporting a base station, which operates in relatively wider bandwidth with conventional UEs, to perform data transmission/reception with the MTC UE, according to an embodiment of the present invention is described. Hereinafter, all of a MTC UE, a low cost UE, a low end UE, a low complexity UE, a narrow(er) band UE, a small(er) band UE, or a new category UE may be used mixed with each other. Or, just UE may refer one of UEs described above. In the description below, a case where system bandwidth of available cells is larger than bandwidth that new category narrow-band UEs can support may be assumed. For the new category UE, it may be assumed that only one narrow-band is defined. In other words, all narrow band UE shall support the same narrow bandwidth smaller than 20 MHz. It may be assumed that the narrow bandwidth is larger than 1.4 MHz (6 RB). However, the present invention can be applied to narrower bandwidth less than 1.4 MHz as well (e.g. 200 kHz), without loss of generality.

The followings may be assumed:

(1) Operating bandwidth of a UE may be known to the eNB. To inform operating bandwidth, multiple approaches may be proposed. It may be assumed that that before scheduling any PDSCH/PUSCH, the eNB knows the operating bandwidth of a UE. In the description below, operating bandwidth in terms of the number of PRBs of a narrow band UE is given as $N_{RB}^{DL\_Op}$. It may be assumed that operating bandwidth is consistent for all narrow band UEs within a cell. Also, UL transmission bandwidth of a narrow band UE may be the same as the DL operating bandwidth, i.e. $N_{RB}^{DL\_Op}$ In other words, UL (RF and) baseband can process only narrow band as well.

(2) Operating bandwidth of a UE may be equal to or larger than 1.4 MHz (or 6 RB), and thus, the UE is able to receive physical broadcast channel (PBCH)/primary synchronization signal (PSS)/secondary synchronization signal (SSS) transmitted over center 6 RB of system frequency band. Otherwise, a new signal similar to PBCH/PSS/SSS may be transmitted to narrower bandwidth. Even with supporting 1.4 MHz, it may be expected that a new signal for PBCH/PSS/SSS are considered to support a low cost UE. In this case, the new signal may be called MTC-PBCH, MTC-PSS and MTC-SSS.

(3) The present invention may be applied two scenarios: (1) RF is capable of receiving system bandwidth (e.g., 20 MHz) but baseband is capable of processing only narrowband, (2) both RF and baseband can handle narrow bandwidth. If the first scenario is used, frequency retuning delay is not considered. If the second scenario is used, tuning delay to change frequency should be considered.

(4) This invention may assume that via RRC signaling (or other means) the UE is notified the number of symbols used for legacy PDCCH (sent over system bandwidth) after serving cell is established. At initial stage, upon receiving PBCH (i.e. discovering system bandwidth), the narrow band UE may configure the default value for the number of symbols for legacy PDCCH to the maximum symbol counts based on system bandwidth (e.g. three for NRBDL=100).

(5) The narrow band UE may support only one LTE band and single radio access technology (RAT). However, it is not precluded to consider inter-RAT handover case for a low cost UE. Just for the simplicity, this invention may assume single-RAT supporting UE.

(6) As the narrow-band UE cannot decode legacy PDCCH, another control channel mechanism (such as enhanced PDCCH transmitted/multiplexed in PDSCH area) may be assumed for supporting narrow band UEs.

Which part of system bandwidth is accessible by the low cost UE according to an embodiment of the present invention is described. Assuming that the system bandwidth is larger than the bandwidth supported by the low cost UE, it needs to be clarified which part of system bandwidth is accessed by the low cost UE. For example, system bandwidth is N and the low cost UE can support M (where N>M), at least one of the following approaches may be considered.

(1) Only center M MHz (or K kHz) may be used by the low cost UE. Regardless of the number of low cost UEs, only center M MHz (or K kHz) may be used. To maximize multiplexing among low cost UEs, time division multiplexing (TDM) between low cost UEs may be considered, where a subset of subframes allocated to each low cost UE is indicated via higher layer signaling or SIB or PBCH. Another approach is to allocate different subframes to different low cost UEs based on a predetermined rule. Similar to device-to-device (D2D) communication, a set of resource pool which can be used by low cost UEs may be signaled via SIB where each low cost UE may claim which pool to use via RRC signaling to the network upon RRC connection.

(2) N MHz can be partitioned to K subDLBWs, where each subDLBW is M MHz. Hereinafter, subDLBW refers a set of PRBs (or bandwidth) that a low cost UE can access at a given subframe. Each subDLBW may transmit individual synchronization signals, such as MTC-PSS/MTC-SSS, such that a UE, once discovers a subDLBW, will stay in that subDLBW. Or, the center subDLBW or one dedicated subDLBW may be used for cell association procedure such as reading synchronization signal, random access channel (RACH) procedure, etc. The frequency used for DL and UL for narrowband UEs may be different. Once the connection is established, the subDLBW may be determined by C-RNTI assigned to the UE. Alternatively, each UE or the network may determine a subDLBW based on scanning each channel, or based on channel state information (CSI) which is signaled via higher layer signaling. Alternatively, random access response (RAR) may carry the information on sub-DLBW which will be used by a UE (which has transmitted the preamble corresponding to the RAR). Once subDLBW is indicated by the RAR, a UE may jump to the subDLBW and transmit PUSCH. It is assumed that DL subDLBW and UL subDLBW may be preconfigured or configured by higher layer. Or, the UL subDLBW may be indicated by DCI only where the UE may ignore PRB allocation which may not fit in its RF bandwidth or baseband processing capability (for example, 8 PRBs are assigned, whereas the UE only supports 6 PRB PUSCH transmission, then 2 PRBs outside of its operating PRB may be ignored or the total grant may be ignored).

(3) A dedicated subDLBW may be assigned. Even though a low cost UE accesses only one subDLBW, the subDLBW may not in the center of the system bandwidth. It may be assigned somewhere else. However from the UE perspective, there is no need to differentiate the dedicated sub-DLBW from 1.4 MHz bandwidth carrier (in other words, no need of separate implementation is needed to support the dedicated subDLBW if it is not in center), if the low cost UE supports 1.4 MHz bandwidth carrier. If the low cost UE is not capable of reading legacy synchronization signals, it may not differentiate one dedicated subDLBW from another one in terms of synchronization and cell detection. In other words, the network may be allowed to setup a different dedicated subDLBW in any frequency (aligned with low cost UE's channel raster) which will be discovered via cell detection procedure.

(4) Another option to determine the available subDLBW is to assume that a set of K subDLBWs is available based on a predetermined rule, similar to physical random access channel (PRACH) resource. For example, start_offset ($n_{PRB\_offset}^{NB}$) and K ($f_{NB}$) may be configured (either by master information block (MIB), SIB, or higher layer signaling), where the subDLBWs are defined as Equation 1 or Equation 2.

$$n_{PRB}^{NB} = \begin{cases} n_{PRB\,offset}^{NB} + 6\left\lfloor \dfrac{f_{NB}}{2} \right\rfloor, & \text{if } f_{NB} \bmod 2 = 0 \\ N_{RB}^{DL} - 6 - n_{PRB\,offset}^{NB} - 6\left\lfloor \dfrac{f_{NB}}{2} \right\rfloor, & \text{otherwise} \end{cases} \quad \langle \text{Equation 1} \rangle$$

By Equation 1, subDLBWs may be placed from the edge except for the offset PRBs.

$$n_{PRB}^{NB} = \begin{cases} n_{PRB\,offset}^{NB} + 6\left\lfloor \dfrac{f_{NB}}{2} \right\rfloor, & \text{if } f_{NB} \bmod 2 = 0 \\ N_{RB}^{DL} - 6 - 6\left\lfloor \dfrac{f_{NB}}{2} \right\rfloor, & \text{otherwise} \end{cases} \quad \langle \text{Equation 2} \rangle$$

By Equation 2, the offset is assume only in one direction. The equations shown above are based on the assumption that the number of PRBs used for narrowband is 6 PRBs. However, the principle may be applicable to any lower number of PRBs or larger number of PRBs allocated to a subDLBW. If one PRB size is used, the index of PRB may be used or only a subset of PRBs may be used with indexing within the subset.

Determination of possible K according to an embodiment of the present invention is described. It may be assumed that in terms of signaling which subDLBW is used, a UE is indicated by an index i out of K. The determination of K may be based on the at least one of followings.

(1) MTC-PBCH or MTC-SIB may inform the list of subDLBWs along with K. In terms of signaling for the list of subDLBWs, it may include the center frequency, or the PRB index where direct current (DC) subcarrier may reside and the subcarrier index which will be assumed as a DC subcarrier for each subDLBW. Additionally, it may also include the bandwidth of subDLBW. Indication of which subDLBW will be used may be signaled additionally by higher layer signaling. Alternatively, indication of which subDLBW may be determined implicitly based on C-RNTI or temporary C-RNTI.

(2) MTC-PBCH or MTC-SIB may inform start_offset ($n_{PRB\_offset}^{NB}$) and K ($f_{NB}$) such that a set of subDLBWs can be formed automatically. More specifically, the values from MTC-PBCH may only indicate subDLBWs which will be used for cell broadcast data such as SIB, paging, RAR, etc. By MTC-SIB or higher layer signaling, a set of subDLBW used for unicast transmission may also be configured. In terms of offset, the offset value may be 0 or 1, where 0 means no offset and 1 means offset of 6 PRBs or K PRB(s) (K is the size of one subDLBW). In other words, subDLBW may be formed without assuming any offset from the PRB 0, whereas, if needed, offset of 6 PRBs or K PRB(s) (K is the size of one subDLBW) is configured. This is to minimize the signaling overhead.

(3) Predetermined set of K subDLBWs may be configured, where K is determined based on the system bandwidth. In this case, even though subDLBW may be predetermined based on system bandwidth, the subcarrier index which will be used for DC subcarrier may be further signaled. It may be common for K subDLBWs or an individual signaling of DC subcarrier may also be considered. Indication of which subDLBW will be used may be signaled additionally by higher layer signaling. Alternatively, indication of which subDLBW may be determined implicitly based on C-RNTI or temporary C-RNTI.

(4) Higher layer signaling may inform the list of subDLBWs along with K. In terms of signaling for the list of subDLBWs, it may include the center frequency, or the PRB index where DC subcarrier may reside and the subcarrier index which will be assumed as a DC subcarrier for each subDLBW. Additionally, it may also include the bandwidth of subDLBW. Indication of which subDLBW will be used may be signaled additionally by higher layer signaling. Alternatively, indication of which subDLBW may be determined implicitly based on C-RNTI or temporary C-RNTI.

(5) Media access control (MAC) control element (CE) and/or dynamic DCI may inform the list of subDLBWs along with K. In this case, DCI may indicate a subset of K subDLBWs used by the network for a low cost UE, out of potentially M subDLBWs feasible in a system bandwidth. In this case, the list of M subDLBWs may be higher layer configured, or broadcasted by SIB or predetermined (by one of the above approaches). In this case, additional DCI or the same DCI may indicate the subDLBW via resource allocation for PDSCH. In other words, if a UE is assigned with different resource from where the control signal is received, it may switch to different subDLBW to read data. Given that a UE may not be able to read different frequency within a subframe, if this is used, cross-subframe scheduling may be used. Alternatively, additional DCI or the same DCI may indicate the subDLBW which will be used in a next subframe. Based on grouping of UEs, for each group, separate DCI may be transmitted to indicate which subDLBW will be used. This DCI may be transmitted periodically. If DCI is not received, the UE may fallback to center subDLBW or use the previously assigned subDLBW.

(6) Paging may indicate the list of subDLBWs. Assuming that only the paging is received at a predetermined subDLBW, paging may indicate the list of subDLBWs. Paging may also indicate the subDLBW used by the UE receiving the paging. In terms of signaling for the list of subDLBWs, it may include the center frequency, or the PRB index where DC subcarrier may reside and the subcarrier index which will be assumed as a DC subcarrier for each subDLBW. Additionally, it may also include the bandwidth of subDLBW.

In terms of indication of subband to be used for the low cost UE, if a UE is not either configured with C-RNTI or temporary C-RNTI, it may be further assumed that an identifier (such as factory-set low cost ID) may be used to determine the subband. This may be applied if the list of subbands are transmitted by the SIB or PBCH or if a set of subDLBWs/subULBWs are predetermined based on system bandwidth. Since PBCH transmits system bandwidth, it may be considered that the list of subbands are indicated by PBCH. Furthermore, whether to use subDLBWs (if predetermined set is used if subDLBW is used) or not may be signaled via SIB or PBCH. In this case, the subband indicates the DL which may also be used for any successive SIB transmission (in this case, the network may transmit synchronization and common channels in multiple subbands) as well as UL where PRACH may be transmitted in that UL subband rather than a center 6 PRBs. The mapping between UL subbands corresponding to DL subbands may be predetermined, or a set of UL subbands may also be indicated by the network via PBCH, or SIB or RAR or higher layer signaling. For the simplicity, it may be assumed that the same subcarrier indices for DL and UL for a subband may be assumed. This is straightforward in case of TDD. In case of FDD, in the matched UL spectrum which has the same system bandwidth as DL, UL subcarriers may match to the DL subcarriers by one-to-one starting from the lowest subcarrier index/frequency of UL and DL, respectively.

How to create subDLBW and/or subULBW according to an embodiment of the present invention is described. More than one subDLBW may utilize one subcarrier. In other words, a subDLBW for a UE may be overlapped with another subDLBW for another UE. A UE supporting reduced bandwidth is not required to monitor more than one subDLBW at a given TTI. However, it would be up to the UE whether to monitor other subDLBW or not. This includes DL monitoring as well as for measurements.

For example, if 8 PRBs may be used for low cost UEs, a set of UEs may be assigned with first 6 PRBs, whereas a different set of UEs may be assigned with the last 6 PRBs. If this is used, 4 PRBs may be overlapped between two subDLBWs. In this case, a UE may assume that cell-common channels are transmitted based on the system bandwidth rather than based on 6 PRBs. If PDCCH for two sets of UEs are shared, either PDCCH may be scheduled only in the overlapped PRBs (i.e. the overlapped 4 PRBs). In this case, the PRBs used for PDCCH needs to be higher layer configured via RRC signaling or via SIB or PBCH.

Alternatively, the PRBs used for PDCCH may be limited to one or a few PRBs regardless of a location of subDLBW, where the location of PDCCH may be prefixed (e.g. at the first PRB or the last PRB, or distributed across 6 PRBs). More specifically, this may be applied only for PDCCH at common search space (CSS), whereas PDCCH at USS may be separate (configured separately per UE or per group). This may be particularly useful when system bandwidth is larger than 6 PRBs, and thus, 6 PRBs may not be aligned with RB group (RBG) or PRB group (PRG). Since it is assumed that the same pre-coding is used for PRG, it is also desirable to consider subDLBWs aligned with PRG for legacy UEs.

It is not desirable to schedule both legacy UE and the low cost UE in the same PRG, if demodulation reference signal (DM-RS) based transmission is used (at least for legacy UE). For example, if the system bandwidth is 100 PRBs, and the RBG size is 4 PRBs per RBG, then totally 25 RBGs are available in the system. If center 6 PRBs are used for low cost UEs, it will use the center 4 PRBs (from 13th RBG) and 1 PRB from the adjacent PRBs, thus, 3 PRBs from the adjacent 2 RBGs may not be used (or not schedulable) to legacy UEs. In this case, total 12 PRBs may be utilized for the low cost UEs. To utilize those adjacent 2 RBGs, two 6 PRBs orthogonal subDLBWs may be formed. Or overlapped subDLBWs may be formed to allow some overlap between subDLBWs.

If overlapped subDLBW is used, utilizing PDCCH becomes a bit challenging. For that, a UE may be higher layer configured with a set of PRBs used for PDCCH (along with potential OFDM symbols) or SIB or PBCH may indicate the set of PRBs used for PDCCH. It is also expected that a new control channel is used for a low cost UE, which may be called as MTC-PDCCH. For MTC-PDCCH, the approaches of enhanced PDCCH (EPDCCH) and/or PDCCH may be applied. In general, the set of PRBs and the number of OFDM symbols used for MTC-PDCCH may be signaled by higher layer or via RAR or SIB or PBCH. Considering this, if cross-subframe scheduling is used or the frequency retuning time is marginal, the subDLBW which transmits PDCCH may be different from subDLBW which schedules PDSCH. In TDD, subDLBW frequency for PDCCH may be different from subULBW frequency for PUSCH transmission as well. By this, multiple DCIs of multiple UEs may be multiplexed, whereas data may be distributed across all PRBs which can be allocated to low cost UEs. In this sense, control channels for MTC may be multiplexed by frequency division multiplexing (FDM) rather than TDM, where control channels for a UE and control channels for another UE may be shared in different frequency (similar to EPDCCH).

In terms of UL subULBW corresponding to DL subDLBW, a straightforward rule may be to map one-to-one. In TDD, the same frequency may be used for DL subDLBW and UL subULBW. Thus, without any additional signaling of UL subULBW, a UE may assume that the same frequency resource of DL subDLBW is used for UL subULBW. Otherwise, higher layer signaling or SIB may indicate the mapping between subDLBW and subULBW. For example, offset of subcarrier between subDLBW and subULBW may be assigned such that (starting of subULBW=starting subcarrier of subDLBW+offset). In general, a set of subDLBWs and a set of subULBWs may be indicated separately. If separate configuration is given, the mapping may also be indicated by higher layer signaling or RAR or SIB or PBCH. For FDD, assuming that the DL-UL gap is K MHz, the frequency of starting of subDLBW+K MHz may become the frequency for the starting of subULBW.

When K is pre-determined, how to define a subDLBW according to an embodiment of the present invention is described. To determine PRBs used for a subDLBW, at least one of following approaches may be considered.

(1) Lowest indexed PRBs or highest indexed PRBs may be used first for a subDLBW. To determine where to put DC subcarrier in terms of RB out of N RBs (which is based on the DL system bandwidth instead of by bandwidth that a low cost UE can support), the lowest indexed RBs (6 PRBs+1 subcarrier or 6 PRBs) and the highest indexed RBs (6 PRBs+1 subcarrier or 6 PRBs) may be used for 1.4 MHz transmission bandwidth (6 PRBs), where the DC subcarrier comes in the center RB. If more than one subDLBW is used, the next 6 PRBs+1 subcarrier may be determined as a subDLBW. For example, if the system bandwidth is 10 MHz, i.e. the number of PRBs is 50, the first 6 PRBs+1 subcarrier [PRB 0-6] is used for the first subDLBW, [PRB 6-12] is used the second subDLBW. A gap between subDLBWs may be considered. In that case, a predetermined gap may be considered between subbands. The subband PRB may be aligned with PRB mapping of the system bandwidth. In other words, the start and end of a subband may be aligned with start and end of PRB boundaries.

(2) PRBs used for a subDLBW may be determined starting from the center. 6 PRBs (3 PRBs/DC subcarrer/3 PRBs) may be the first subDLBW. The second subDLBW may be defined as the next 6 PRBs+1 subcarrier.

(3) PRBs used for a subDLBW may be aligned with RBG for each system bandwidth. For example, for 3 MHz, the size of RBG is 2, and thus, to allow at least one RBG being intact, rather than starting from the lowest index PRB, it may start at 3rd with 3 MHz system bandwidth.

(4) PRBs used for a subDLBW may be determined starting from the edge PRBs first. For example, if the system bandwidth is 100 PRBs, the first 6 PRBs may form the first subband, the last 6 PRBs may form the second subband, the next lowest 6 PRBs may form the third subband, and so on.

FIG. 6 shows an example of a set of PRBs accessible by a low cost UE according to an embodiment of the present invention. It is assumed that M=1.4 MHz, N=3 MHz, and center 6 PRBs are used for 1 subDLBW. In this case, K=1. Referring to FIG. 6, center 6 PRBs or 6 PRBs+1 subcarrier is assigned for a subDLBW.

FIG. 7 shows another example of a set of PRBs accessible by a low cost UE according to an embodiment of the present invention. It is assumed that M=1.4 MHz, N=3 MHz, and center 6 PRBs are not used. In this case, K may be 2. Referring to FIG. 7, the lowest indexed PRBs and the highest indexed PRBs are assigned for 2 subDLBWs.

FIG. 8 shows another example of a set of PRBs accessible by a low cost UE according to an embodiment of the present invention. It is assumed that M=1.4 MHz, N=3 MHz, and center 6 PRBs are not used. In this case, K may be 2. Referring to FIG. 8, legacy UEs may be assigned to the lowest indexed PRBs, and the highest indexed PRBs are assigned for 2 subDLBWs with consideration of alignment of RBS.

FIG. 9 shows another example of a set of PRBs accessible by a low cost UE according to an embodiment of the present invention. It is assumed that M=1.4 MHz, N=5 MHz, and center 6 PRBs are used for 1 subDLBW. Referring to FIG. 9, K=1 and center 6 PRBs or 6 PRBs+1 subcarrier is assigned for a subDLBW.

FIG. 10 shows another example of a set of PRBs accessible by a low cost UE according to an embodiment of the present invention. It is assumed that M=1.4 MHz, N=5 MHz, and center PRBs are used for multiple subDLBWs. Referring to FIG. 10, K=3 and center PRBs are assigned for 3 subDLBWs.

FIG. 11 shows another example of a set of PRBs accessible by a low cost UE according to an embodiment of the present invention. It is assumed that M=1.4 MHz, N=5 MHz, and center 6 PRBs are not used. Referring to FIG. 11, K=4 and the lowest indexed PRBs and the highest indexed PRBs are assigned for 4 subDLBWs.

FIG. 12 shows another example of a set of PRBs accessible by a low cost UE according to an embodiment of the present invention. It is assumed that M=1.4 MHz, N=5 MHz, and center 6 PRBs are not used. Referring to FIG. 12, K=3 and legacy UEs may be assigned to some PRBs. The remaining PRBs are assigned for 3 subDLBWs with consideration of alignment of RBS.

If N=10 MHz, the more cases may be possible.

For another approach, the subband may be created from the edge where a small size of narrowband may be formed in the center. A DL narrowband may consist of a set of contiguous PRBs. In case that a low cost UE needs to monitor PSS/SSS/PBCH of a cell, it may be retuned to center 72 subcarriers (excluding system DC) if a low cost UE can support at least 1.4 MHz RF bandwidth and baseband processing. If not, it may be retuned to a dedicated narrowband where synchronization and/or MIB is transmitted. A DL narrowband whose center frequency is aligned with center frequency of system bandwidth may be fully overlapped with center 72 subcarriers (excluding system DC). This narrowband may be called center narrowband. Other than the center narrowband, multiple non-overlapped DL narrowbands may be specified for system bandwidth wider than 3 MHz. The number of DL narrowbands may be 1 in 1.4 MHz, 3 in 3 MHz, 5 in 5 MHz, 9 in 10 MHz, and 17 in 20 MHz. For the narrowbands not adjacent with center narrowband, the size of narrowband may be 6 PRBs. A UL narrowband may consist of a set of contiguous 72 subcarriers. For a UL narrowband, non-overlapped narrowbands may be specified for system bandwidth wider that 3 MHz. The size of each narrowband may be 6 PRBs.

FIG. 13 shows an example of a center narrowband according to an embodiment of the present invention. Referring to FIG. 13, when the system bandwidth is 3 MHz, the center narrowband, which is the region where data/control signal can be scheduled or not, consists of center 3 PRBs. A UE may monitor center 72 subcarriers (6 PRBs) for PSS/SSS/PBCH.

FIG. 14 shows another example of a center narrowband according to an embodiment of the present invention. Referring to FIG. 13, when the system bandwidth is 5 MHz, the center narrowband, which is the region where data/control signal can be scheduled or not, consists of center 1 PRB. A UE may monitor center 72 subcarriers (6 PRBs) for PSS/SSS/PBCH.

FIG. 15 shows another example of a center narrowband according to an embodiment of the present invention. Referring to FIG. 13, when the system bandwidth is 10 MHz, the center narrowband, which is the region where data/control signal can be scheduled or not, consists of center 2 PRBs. A UE may monitor center 72 subcarriers (6 PRBs) for PSS/SSS/PBCH.

To allow efficient operation, in case of hopping is used, the mapping of 6 PRBs to a center narrowband lower than 6 PRBs may be as follows.

(1) The first PRB in the center narrowband may be mapped to the first PRB (and so on). In this case, some PRBs in 6 PRBs cannot be mapped to the center narrowband lower than 6 PRBs which will be rate matched.

(2) Center of the center narrowband may be mapped to the center of center PRBs such that PRBs in the edge may not be used or mapped in the center narrowband. For example, in case of 4 PRBs, two PRBs in the edge may not be mapped.

(3) A UE may assume that the center narrowband may not be used for frequency hopping or data scheduling.

Rules for utilizing a subDLBW according to an embodiment of the present invention is described. Overall, at least one of the following rules may be considered.

(1) If subDLBW other than a subDLBW in the center of a system bandwidth is used, DC subcarrier may be created by not transmitting or puncturing the data in REs used for DC. To support legacy PDCCH transmission, REs not used for PDCCH may be only punctured. Alternatively, REs in PDCCH region may also be punctured (which may impact the legacy UE PDCCH reception performance which will be handled by the network by proper adjustment of code rate or other means). Even though the PDCCH region may be punctured for DC subcarrier creation, it may be assumed that the RB boundary is not changed in the PDCCH region. In other words, RB allocation (for example, 12 subcarriers per RB other than RB containing DC subcarrier for a legacy UE) for a legacy UE may be assumed in the PDCCH region. For the PDCCH region, for multicast broadcast single frequency network (MBSFN), the first two OFDM symbols may be assumed as PDCCH region. For normal subframes, by higher layer configured, the number of first few OFDM symbols may be assumed as PDCCH region.

(2) If MBSFN subframe is used for creating more than one subDLBW for a low cost UE and the UE may read other subDLBW than the center only in MBSFN subframes, no consideration to handle cell-specific reference signal (CRS) Vshift may be necessary. If not, subDLBW DC subcarrier may be created in consideration of CRS RE location. However, to allow low complex UE implementation, even with MBSFN subframe, it is desirable not to change Vshift value of CRS mapping. In other words, CRS RE mapping pattern needs to be maintained as fixed regardless of the location of subDLBW. If the subDLBW outside of the center subDLBW is accessed in normal subframe as well, consideration on CRS RE location may be needed. More importantly, CRS RE may not be used for DC subcarriers.

(3) To maximize the spectral efficiency or minimize the unused PRBs, alignment of subDLBW to RBG may be considerable. When it create a subDLBW which requires 6 PRBs+1 subcarrier for a DC subcarrier (and thus requires 7 PRBs), it should maximize the usable RBGs which is determined based on system bandwidth.

(4) CRS transmission for PDCCH region or region may be accessed by a legacy UE regardless of MBSFN subframe or normal subframe following legacy CRS RE mapping.

(5) CRS transmission for non-PDCCH region in MBSFN subframe may follow 1.4 MHz system bandwidth CRS transmission centered at the DC subcarrier of a subDLBW in terms of RE mapping and sequence generation. Alternatively, CRS transmission in non-PDCCH region in normal and/or MBSFN subframe may still follow system bandwidth. In which case, the UE needs to read CRS a bit differently depending on where the subDLBW is located. If the subDLBW is in center 6 PRBs, CRS mapping is same as 1.4 MHz system bandwidth system. However, if subDLBW is not in center 6 PRBs, the RE mapping of CRS may follow system bandwidth which is different from RE mapping of 1.4 MHz system bandwidth.

(6) If a subband overlaps partially with center 6 PRBs where the center of a subband is different from the center of system bandwidth, it is up to UE implementation to handle possibly two DC subcarriers. To avoid this case, it may be assumed that a subband may not be overlapped with center 6 PRBs partially. If it is overlapped, either it may be totally overlapped or only 5 PRBs out of the center 6 PRBs (in case odd system bandwidth) may be used for a subband. In other words, if a subband is partially overlapped with center 6 PRBs, the center frequency of that subband may be assumed as the center frequency of the system bandwidth. In that case, to align with legacy PRB boundary, in odd system bandwidth cases, only 5 PRBs may be used as a valid PRBs in that subband. A subband size may be smaller than 6 PRBs. Similarly, if SIB is transmitted in center 6 PRBs, in odd system bandwidth, to align with legacy PRB mapping, it may be assumed that only 5 PRBs carry SIB. In other words, half-PRBs in the start and end may not be used for data transmission in odd system bandwidth.

FIG. 16 shows an example of CRS RE mapping to subDLBW other than center 6 PRBs according to an embodiment of the present invention. FIG. 16 corresponds to a case that CRS RE mapping is different between PDCCH region and MBSFN region. Referring to FIG. 16, if different CRS RE mapping in PDCCH region and MBSFN region (i.e. non-PDCCH region) is used, a low cost UE may need to assume different CRS RE pattern in first two OFDM symbols and the rest of OFDM symbols. Thus, in this case, it is more desirable not to read first two OFDM symbols (or regions where legacy UE can access). If this approach is used, the actual subcarrier carrying the CRS in the first slot (e.g. first OFDM symbol) and the second slot change.

FIG. 17 shows another example of CRS RE mapping to subDLBW other than center 6 PRBs according to an embodiment of the present invention. FIG. 17 corresponds to a case that CRS RE mapping is consistent regardless of region. Referring to FIG. 17, the same subcarrier is used regardless of DC subcarrier. Then, a legacy UE may be able to read CRS even with creating a set of subDLBWs. However, from a low cost UE perspective, depending on its subDLBW location and the location of DC subcarrier, CRS pattern (e.g. Vshift value) may change. Thus, depending on the accessing subDLBW, it needs to adjust CRS pattern. For example, in FIG. 17, the bottom PRB may have Vshift=4, and the upper PRB may have Vshift=5. Thus, different Vshift or CRS pattern for lower PRBs than DC subcarrier or higher PRBs than DC subcarrier (in terms of frequency) may be required. This only needs in case of introducing artificial DC subcarrier, thus, when a UE access the center 6 PRBs, this is not needed. Thus, two different implementations may be needed and the UE may need to switch between both implementations per subframe.

Determining location of artificial DC subcarrier for a subDLBW (subcarrier index) according to an embodiment of the present invention is described. To allow DC subcarrier not interfering CRS transmission, the location of DC subcarrier (REs punctured) may be configured by PBCH or SIB. Or, the location of DC subcarrier may be higher layer configured for each UE assigned to that subDLBW. Or, it may be computed based on cell ID or the RE mapping of CRS. For example, (subcarrier cell ID) % 6+m (e.g. m=1) may be used for DC subcarrier in a RB. The motivation is to minimize the impact of DC subcarrier to support a low cost UE in a subDLBW which may not be in center (center frequency already provides DC subcarrier, thus no additional handling is needed if subDLBW is the center 6 PRBs). Alternatively, DC subcarrier may not be created for a subband outside of center. In this case, the performance may be degraded. Also, if DM-RS based data modulation is used, DM-RS RE may not be used for the artificial DC subcarrier. Alternatively, center subcarrier out of 6 PRBs may be used for DC subcarrier. Since there are possibly two subcarriers belonging to the different PRBs, either one may be used. If the subcarrier does not carry CRS, the lower frequency subcarrier may be used for DC subcarrier. Otherwise, the higher frequency subcarrier may be used for DC subcarrier.

SubDLBW or SubULBW determination for each channel according to an embodiment of the present invention is described. When a set of subDLBW and/or set of subULBW is defined, the location of frequency for each channel may be determined differently depending on the channel type. In terms of determining frequency location for each channel, followings may be considered.

(1) PBCH: If legacy PBCH is used, it may be considered that legacy PBCH is transmitted over the center 6 PRBs. For repeated PBCH to support coverage enhancements, the repeated PBCH may be located in center 6 PRBs. Alternatively, Assuming that coverage enhancement is supported by the network with more than 1.4 MHz system bandwidth, the repeated PBCH may be placed in a different but prefixed location. If new PBCH is considered, it may be considered that new PBCH is transmitted in a dedicated location based on the assumption that the network has more than 1.4 MHz system bandwidth such that the dedicated subband may not be placed in the center 6 PRBs. By default, the location may be the center 6 PRBs as well. The location and RE mapping for the new PBCH, however, may not be changed based on the overall system bandwidth. The design may be consistent regardless of actual system bandwidth.

(2) SIB: If new SIB is considered, fixed location may be used for SIB transmission. To allow efficient use of resources, the location of SIB may be prefixed which may be prefixed per system bandwidth in consideration of alignment with PRG and/or RBG. For example, in system bandwidth of 100 PRBs system, since RBG size is every 2 PRBs, and if the number of PRBs used for SIB is for example 4, 4 PRBs may be predetermined which is aligned with PRG/RBG. To align with PRG, two PRGs may be allocated near center or in some frequency location may be prefixed for SIB location. In other words, a default location of SIB may be different per system bandwidth. Furthermore, the location of SIB may be changed over subframes. The location may be predetermined dependent on system frame number (SFN) or subframe index or may change/hop based on a cell-specific pattern. Furthermore, the location of SIB may be different based on cell ID. It may be determined based on both cell ID and system bandwidth. Per system bandwidth, there may be multiple PRG/RBGs where SIB may be located and the location may be selected based on cell ID. To support this, a UE may need to acquire system bandwidth before reading SIB. Furthermore, the location of SIB1 and SIB2 may be different and other SIBs may be transmitted in different locations. If needed, the location of other SIBs may be signaled from either SIB1 or SIB2. Also, the number of repetitions/periodicity of SIBs may be signaled from SIB1 or SIB2.

(3) Paging: Considering particularly coverage enhancements, the location of paging may not be desirable if it is fixed in center 6 PRBs. A UE may receive paging once it is at least camped on a cell, thus, the UE may be able to know the system bandwidth of the cell. The location of paging may be determined based on at least one of cell ID, P-RNTI, UE ID, subframe index (paging subframe), or radio frame index (paging radio frame). Also, a combination of those parameters may be used to determine the location of paging occurrence from the frequency and/or time resource perspective. For repeated paging, the location may be changed or fixed. A fixed location in center 6 PRBs may also be considered.

(4) RAR: The location of RAR may be determined based on at least one of preamble index used for PRACH, cell ID, RA-RNTI, higher layer configuration (such as via SIB), subframe index (RAR starting subframe), or radio frame index (RAR starting radio frame). A combination of those parameters may be used to determine the location of RAR occurrence from the frequency and/or time resource perspective. For repeated RAR, the location may be changed or fixed. A fixed location in center 6 PRBs may also be considered.

(5) PRACH: The location of PRACH may be determined based on at least one of preamble index, UE ID, cell ID, subframe index (PRACH starting subframe), or radio frame index (PRACH starting radio frame). A combination of those parameters may be used to determine the location of PRACH. A fixed location in center 6 PRBs may also be considered.

(6) Message 3: The location of message 3 may be determined based on RAR dynamically (i.e. frequency location used for RAR may determine the frequency or subULBW of message 3) or fixed or determined by RAR (explicitly indicated in RAR).

(7) EPDCCH CSS: The location of EPDCCH at CSS may be fixed in center. Alternatively, the location of EPDCCH at CSS may be fixed based on cell ID. Alternatively, the location of EPDCCH at CSS may be fixed based on SI-RNTI or some RNTI. Location may change per subframe based on a pattern.

(8) EPDCCH USS: The location of EPDCCH at CSS may be fixed or determined based on a pattern dynamically or semi-statically. The location of EPDCCH at CSS may determined based on at least one of UE ID, C-RNTI, cell ID, subframe index (EPDCCH starting subframe index), or radio frame index (EPDCCH starting radio frame index). A combination of those parameters may be used to determine the location of EPDCCH at CSS.

(9) PUCCH: The location of PUCCH may be fixed or determined based on a pattern dynamically or semi-statically. That is, the location of PUCCH may be determined similar to EPDCCH or may mapped to the CCE of the first PDSCH where ACK/NACK is transmitted. For CSI feedback, a fixed (higher layer configured) location may be used.

(10) PDSCH: The location of PDSCH may be fixed or may be determined dynamically via DCI or semi-statically via higher layer.

(11) PUSCH: The location of PUSCH may be fixed or may be determined dynamically via DCI or semi-statically via higher layer.

Relationship between UE-specific subDLBW and cell-specific subDLBW according to an embodiment of the present invention is described. It may be generally assumed that subDLBW configured for cell-specific channel such as SIB is different from UE-specific subDLBW. In that case, since a UE can access only one subDLBW in a subframe, if different location is used, frequency switch between UE-specific subDLBW and cell-specific subDLBW may be necessary. To allow frequency switching delay, one subframe or a few OFDM symbols before and after cell-specific subframe where a UE monitors cell-specific subDLBW may be considered. Since a UE may not access cell-specific channel all the time, a UE may autonomously create a gap (frequency switching gap) by not receiving some data before and after cell-specific channel. Particularly, in a coverage enhancement mode, cell-specific channel may come in during the repetition of unicast data. In such a case, the following approaches may be considered.

(1) A set of subframes which may carry cell-specific channel may be prefixed such that a UE can assume that any unicast data is not repeated in a subframe where possibly cell-specific channel can be transmitted. In such a case, a gap for frequency switching before and after cell-broadcast subframe may also be assumed that any repetition is not occurred in those gaps either.

(2) A set of subframes where unicast channel may be transmitted may be used either for cell-specific or frequency switching or other purpose.

(3) Regardless of cell-specific channel, repetition may occur based on the configuration. If a UE needs to read cell-specific channel (repeated broadcast), it may autonomously create gap and may not receive the repeated unicast channel in that subframe where cell-specific channel is being received.

(4) During the repetition of unicast channel, cell-specific channel may not be received. Cell-specific channel may be received only when there is no unicast data is being transmitted/received.

Here, unicast data may refer PDSCH transmission as well as (E)PDCCH transmission for unicast data scheduling. Also cell-specific channel may refer PDSCH transmission as well as (E)PDCCH transmission for cell-specific data scheduling. In other words, even control channel and data between unicast and broadcast may follow the option(s) addressed above. Particularly, the last option means that control channel and data channel between CSS and USS may not be occurred simultaneously within a bundle. A new bundle of either control signal or data channel may start only after the current bundle finishes.

SubDLBW/SubULBW determination in retransmission according to an embodiment of the present invention is described. Depending on the number of repetitions (or coverage enhancement level) required for each transmission, the number of subframes required for one bundled transmission may be different. With many UEs with different repetition or coverage enhancement levels, it may be difficult to manage different numbers of subframes in a subDLBW. Thus, one approach to consider is to map subDLBW to coverage enhancement level or repetition level, such that the number of subframes used in a subDLBW is fixed where different subDLBWs may have different number of repetitions/coverage enhancement levels. When a UE is configured by higher layer with coverage enhancement level or repetition level, it may refer subDLBW associated with the configured coverage enhancement/repetition level. Alternatively, by configuring a subDLBW, a UE may also infer coverage enhancement/repetition level. Or, it may also configure subDLBW and coverage enhancement/repetition level as well.

When a UE performs retransmission, since initial transmission already transmits a bunch of PUSCH, it is desirable to reduce the number of repetitions. In such a case, one approach is to switch to different subDLBW with smaller repetition level or lower coverage enhancement level for each repetition. The larger retransmission counter, the smaller coverage enhancement/repetition level may be considered. In terms of resource allocation, the same resource allocation per initial transmission UL grant may be used unless another DCI is received to indicate otherwise.

RAR retransmission (repetition number change) according to an embodiment of the present invention is described. Due to miscomputation of coverage enhancement/repetition level, the RAR reception may fail. In that case, if the network receives PRACH retransmission, it may increase the RAR repetition level. One simple approach is to map the repetition level of RAR to PRACH repetition level such that RAR repetition level increases with PRACH retransmission. Another approach is to increase RAR repetition level per PRACH retransmission once the network detects the retransmission of PRACH from the same UE.

Paging retransmission (repetition number change) according to an embodiment of the present invention is described. Since a UE's coverage enhancement level may change, determining coverage enhancement level for paging may be tricky. Thus, maximum coverage enhancement level for paging may be considered. However, this may degrade system spectral efficiency particularly if the network does not have many UEs requiring large coverage enhancement level. Furthermore, if a UE's coverage enhancement level becomes larger than the maximum coverage enhancement level that the network can support, the network still may support larger number of repetitions or the network may support larger coverage enhancement level for paging compared to other channels (i.e. max coverage enhancement level for paging may be larger than max coverage enhancement level for other channels). In terms of coverage enhancement level expectation from a UE perspective, the following options may be considered.

(1) Paging may always start from the lowest coverage enhancement level (i.e. coverage enhancement level=0 dB) and may move to the next coverage enhancement level if the initial paging fails. In this case, to determine whether the initial paging has failed or not, it may be assumed that control channel scheduling the paging may be transmitted using the maximum coverage enhancement level such that with high probability, the UE can acquire the control channel at least. If the initial transmission fails, the UE may assume that the larger coverage enhancement/repetition level is used for retransmission such that a UE monitors the next or larger coverage enhancement/repetition level paging occasion/subframes.

(2) Paging may start from the coverage enhancement level which has been successful last time (for the retransmission, higher repetition level may be used). For this, a UE/the camp-on cell may maintain the coverage enhancement level used in the last time.

(3) Paging may start from the coverage enhancement level which was used in RRC_CONNECTED mode (for the retransmission, higher repetition level may be used). For this, a UE/the camp-on cell may maintain the coverage enhancement level configured in RRC_CONNECTED mode. Even with option, if coverage enhancement level changes, the last used coverage enhancement level may override the stored coverage enhancement level used in RRC_CONNECTED mode.

(4) Another option is to transmit signal coverage enhancement level before transmitting paging using the maximum coverage enhancement level in a preconfigured resource where the UE can interpret the resource and/or coverage enhancement level of paging transmission if there is a paging. For this, a small transmission such as control channel based transmission to indicate the existence of paging with coverage enhancement level may be considered.

A signal generation for a subDLBW according to an embodiment of the present invention is described. Starting DC subcarrier as 0, subcarrier index may start as if the system bandwidth is 1.4 MHz and the UE is served in that 1.4 MHz system bandwidth. In other words, the signal may be generated as follows where the number of PRBs is 6 and the number of subcarriers per RB is 12. This may be applied to signals transmitted in non-PDCCH region or OFDM symbols signaled by the network which may be used for a low cost UE. For example, if the higher layer signals that a low cost UE can access OFDM symbols 4-13, the signals transmitted in OFDM symbols 4-13 of a subDLBW used by a low cost UE based on 73 subcarrier bandwidth (72 subcarriers+1 DC subcarrier) may follow Equation 3 below.

$$s_l^{(p)}(t) = \sum_{k=-\lfloor N_{RB}^{DL}N_{sc}^{RB}/2 \rfloor}^{-1} a_{k(-),l}^{(p)} \cdot e^{j2\pi k \Delta f(t-N_{CP,l}T_s)} + \sum_{k=1}^{\lceil N_{RB}^{DL}N_{sc}^{RB}/2 \rceil} a_{k(+),l}^{(p)} \cdot e^{j2\pi k \Delta f(t-N_{CP,l}T_s)} \quad \langle \text{Equation 3} \rangle$$

At least for PDSCH and/or DM-RS, signal generation described in Equation 3 may be used. Further, when a subDLBW is used, the sequence generation of cell-specific signals/data, e.g. CRS, CSI-RS, may be assumed based on system bandwidth. Cell-specific data may be read in a set of PRBs for a reduced bandwidth UE based on partial PRB reading out of wideband system bandwidth.

Consideration of impacts and multiplexing on legacy UEs according to an embodiment of the present invention is described. So far, it is assumed that size of a subDLBW is 6 PRBs+1 DC (72 subcarriers+1 DC subcarrier=73 subcarriers). However, subDLBW of 6 PRBs where 1 DC subcarrier is created by RE puncturing may also be considered. In this case, the available RE in a RB containing DC subcarrier may be smaller than other RBs. However, this may be compensated by the network scheduling.

Even if this is used, DC subcarrier may be selected such that it does not collide with CRS transmission. One example as mentioned before is to use (Cell ID) % 6+1. Also, other mechanisms mentioned above may be applicable as well. Even with 6 PRBs for 1.4 MHz without additional DC subcarrier, in terms of transmission bandwidth, system bandwidth may be assumed to be 1.4 MHz from the RF and baseband processing perspective. One additional subcarrier (not carrying data for the low cost UE) processed in baseband may be treated as if REs containing no data. If there is CRS transmission in that subcarrier, CRS may be read. In this case, however, signal generation may not consider the center DC subcarrier. Only puncturing to minimize the interference may be used in REs for DC subcarrier.

Which area to read by a reduced bandwidth UE according to an embodiment of the present invention is described. A low cost UE may skip reading first few OFDM symbols as it does not give any useful information to the UE. The starting OFDM symbol where narrow band transmission occurs may be signaled to a UE via PBCH, SIB or higher layer signaling. SIB1 may carry the starting OFDM symbol for control/data channels. If a UE is configured by higher layer to apply different starting OFDM symbol than it from SIB1, it may follow higher layer signaling rather than SIB signaling. It may be only applicable to unicast transmission, whereas the starting symbol may be determined by SIB and the starting symbol may be by default determined by SIB and may be updated by dynamic or semi-static signaling. In case of dynamic signaling, common DCI such as DCI format 1C may be utilized. It may be delivered periodically or aperiodically.

Also, if a UE knows the MBSFN configuration or a set of subframes which may not be used for legacy UEs, a different OFDM symbol starting position from other normal subframes may be assumed. A separate signaling to indicate control format indicator (CFI) value on those subframes may be further considered. Alternatively, a UE may perform decoding blindly two or more candidates of starting OFDM symbol such that the network may change the starting OFDM symbol dynamically. Another approach is to signal by scheduling DCI where unless indicated otherwise, CFI value may be determined by the most recently received control channel/DCI for unicast data transmission.

However, CRS transmission in the first few OFDM symbols still may be used for channel estimation and time/frequency tracking. Thus, for soft buffer to store law data, only OFDM symbols which can carry data/control for a low cost UE may be considered to further reduce the cost. However, there may be no legacy PDCCH in a TTI as the network may not transmit any PDCCH. This means that, in some cases, PDSCH for a reduced bandwidth UE may start from the OFDM symbol 0. Thus, from the buffering perspective, it is yet desirable to consider buffering the entire OFDM symbols (i.e. from 0 to 13 in normal CP and from 0 to 11 in extended CP).

Furthermore, if MBSFN subframes are used for supporting low cost UEs, the used CP may be different from subframe #0 where the used CP may be signaled via PBCH, SIB or higher layer. If MTC-PSS/MTC-SSS is used, the CP may be estimated/detected by reading MTC-PSS/MTC-SSS. Or for a low cost UE, it may be assumed that extended CP is always used.

Assumption regarding which subframes to read by a reduced bandwidth UE according to an embodiment of the present invention is described. Overall, it is more natural to assume that if subDLBWs (if more than 1 is used) other than center 6 PRBs are used for low cost UEs, it may be restricted to MBSFN subframe. In other words, a low cost UE may read different subDLBWs other than center 6 PRBs only in MBSFN subframe, and read center 6 PRBs in non-MBSFN subframes. Thus, a reduced bandwidth UE may assume that there are a set of subframes readable by itself (i.e. not every subframe is available for a low cost UE). If a low cost UE reads both MBSFN and non-MBSFN subframes, the CP length may be determined by CP used in normal DL subframe. It is not assumed that a low cost UE assumes different CP length per subframe.

In general, a low cost UE may be configured with a set of subframes and a set of subDLBWs to read at each subframe or per subframe, which may be higher layer configured. The same principle may be applied to the boundary of RB and/or CRS RE mapping. For example, if RB boundary and/or CRS pattern for a low cost UE is different, which requires CRS transmission pattern change to allow simple UE implementation, this may be only applied in MBSFN subframes. Thus, if a low cost UE needs to read only MBSFN subframes, different RB allocation or CRS RE mapping based on artificial DC subcarrier (artificially created DC subcarrier for a subDLBW by puncturing by the network) may be used. If the UE needs to read both normal and MBSFN subframe, CRS mapping for a subDLBW may follow the pattern assuming RB allocation with no DC subcarrier. In other words, by creating artificial DC subcarrier in normal subframe, 3 PRBs in the lower side of DC subcarrier (or higher side of DC subcarrier in terms of frequency) may have one subcarrier shifted CRS pattern compared to the rest of 3 PRBs. Furthermore, depending on the location of DC subcarrier, the CRS pattern may change.

FIG. 18 shows an example of Vshift for CRS depending on a DC subcarrier according to an embodiment of the present invention. FIG. 18 corresponds to a case that CRS RE mapping is different between PDCCH region and MBSFN region.

FIG. 19 shows another example of Vshift for CRS depending on a DC subcarrier according to an embodiment of the present invention. FIG. 19 corresponds to a case that CRS RE mapping is consistent regardless of region. If the same CRS pattern is assumed regardless of artificial DC subcarrier, the CRS RE mapping may change based on the location of DC subcarrier. Referring to FIG. 19, if Vshift value is 4 in the system bandwidth with PCID, if DC subcarrier is created at subcarrier 5 (which is 4+1), if the same RE mapping is used, Vshift value for the CRS pattern in the lower frequency part from the DC subcarrier is Vshift=2 and higher frequency part from the DC subcarrier is Vshift=5. Thus, the UE needs to compute Vshift (or CRS pattern) based on the location of DC and the PCID. If DC subcarrier is used at subcarrier of Vshift+1, Vshift value for CRS pattern for a RB for a low cost UE may become 5. Thus, a UE may be hard-coded about Vshift value.

However, if DC subcarrier is created based on Vshift, among cells, the location of subDLBW may not be aligned. In this case, inter-cell interference issue may become considerable. Thus, it may be considerable to fix the location of DC subcarrier (such as subcarrier 6th of a center RB of a subDLBW regardless of Vshift). In this case, if CRS RE may present in that DC subcarrier, it may not be able to be punctured. Thus, the cell may not create any subDLBW in that case other than center 6 PRBs or the cell may allow only MBSFN subframe usable for subDLBW (in which case, CRS in PDCCH region may not be punctured). In terms of implementation, since CRS based channel estimation is a bit separate logic from data decoding, it is also possible to assume the same CRS RE mapping regardless of region, where CRS pattern is always determined based on system bandwidth rather than a location of subDLBW.

It may be further assumed that a low cost UE may not need to support positioning reference signal (PRS) and/or CSI-RS based CSI feedbacks.

Regardless of which mechanism is used, a low cost UE may need to know the system bandwidth to determine RE mapping. Thus, MTC-PBCH may transmit either system bandwidth of the network or whether system bandwidth is odd or even (i.e. the number of PRBs for the system bandwidth is odd or even, for example, for 3 MHz system, the network may signal odd).

If K is more than 1, the UE may need to know the system bandwidth to read CRS and necessary signals which is scrambled based on the DL system bandwidth.

Based on the above discussions, in terms of CRS reading, the following options may also be considerable.

(1) Considering fixed subDLBW used for a low cost UE, CRS in center 6 PRBs may be read by a low cost UE.

(2) Considering potentially different subDLBW from a center 6 PRBs, CRS may read by a low cost UE which are transmitted only in non-PDCCH region. In this case, the number of CRS REs may be reduced and thus channel estimation, time/frequency tracking may be reduced. Thus, increase of CRS RE density may be considered. However, this does not require different UE implementation regardless of subDLBW location (whether in center 6 PRBs or not). If only MBSFN subframe is readable by a UE, CRS RE pattern of extended CP at least for normal CP frame structure may be used. Since there are 12 OFDM symbols, the pattern of extended CP may be used for non-PDCCH region in MBSFN subframe.

(3) Considering potentially different subDLBW from a center 6 PRBs, depending on the location of a subDLBW that a low cost UE reads, different RE mapping of CRS may be assumed (if it is center 6 PRBs, CRS RE mapping does not account for center DC subcarrier, whereas if the sub-DLBW is not in center 6 PRBs, CRS RE mapping is regardless of REs for DC subcarrier), and thus, it may require different logic of CRS reading depending on the location.

(4) CRS RE mapping pattern may always be determined based on system bandwidth regardless of location of sub-DLBW (which is somewhat equivalent to (3)).

Given that PDCCH is not shared between legacy UE and low cost UE, it is desirable to support option (2) described above to minimize UE complexity. However, this requires 6 PRBs+1 subcarrier for a subDLBW size. If a subDLBW size is 6 PRBs only, option (3) may be necessary. Similarly for other RS such as DM-RS, CSI-RS, depending on the size of a subDLBW not in center 6 PRBs, the RE mapping for each RS may be different. If 6 PRBs is used for a subDLBW, signal generation may follow Equation 4 below.

$$s_l^{(p)}(t) = \sum_{k=-\lfloor N_{RB}^{DL} N_{sc}^{RB}/2 \rfloor}^{-1} a_{k(-),l}^{(p)} \cdot e^{j2\pi k \Delta f(t-N_{CP,l}T_s)} + \sum_{k=1}^{\lceil N_{RB}^{DL} N_{sc}^{RB}/2 \rceil - 1} a_{k(+),l}^{(p)} \cdot e^{j2\pi k \Delta f(t-N_{CP,l}T_s)}$$

⟨Equation 4⟩

In Equation 4, it is assumed that that REs used for DC subcarrier reside in the center (between two subcarriers of the center, the higher frequency subcarrier is used), and the number of PRBs is 6 and the number of subcarrier per PRB is 12. Or, a low cost UE may read only portion of data based on the assumption that signal is generated based on the system bandwidth. In that case, the number of PRBs may be the same as the system bandwidth. In this case, a UE may assume that REs used for DC subcarrier are punctured.

RB allocation for a reduced bandwidth UE according to an embodiment of the present invention is described. Considering potentially different RB allocation for a low cost UE, various kinds of options for data transmission/RB allocation may be considered.

FIG. 20 shows an example of a RB allocation with artificial DC subcarrier according to an embodiment of the present invention. FIG. 20 shows a case that the size of subDLBW is 6 PRBs. In this case, the RB allocation by artificial DC subcarrier may be aligned with legacy PRB.

FIG. 21 shows another example of a RB allocation with artificial DC subcarrier according to an embodiment of the present invention. FIG. 21 shows a case that the size of subDLBW is 6 PRBs+1 subcarrier. In this case, the RB allocation by artificial DC subcarrier may be separate for a reduced bandwidth UE from legacy PRB.

RB allocation issue for a center subDLBW depending on system bandwidth according to an embodiment of the present invention is described. If a UE supports only 1.4 MHz, depending on the system bandwidth (even or odd), the RB mapping of center 1.4 MHz subDLBW may be different around the center DC subcarrier. If the system bandwidth is even, DC subcarrier is located between two PRBs, whereas if the system bandwidth is odd, DC subcarrier is located within a PRB. Thus, the transmission bandwidth may not seem to be aligned if odd system bandwidth supports 1.4 MHz. There are potentially different approaches to address this issue.

(1) Only even system bandwidth may support center 1.4 MHz subDLBW for a low cost UE.

(2) A virtual RB based on 1.4 MHz may be reformed. If this is used, CRS transmission within a PDCCH region may not be readable or decodable by a low cost UE. Or, only 6 subcarriers may shifted. In other words, RB mapping may change, yet, the same CRS location may be used at least for center 1.4 MHz. (CRS sequence is okay with shifting RB 6 subcarriers as the starting point from DC is remained as the same).

FIG. 22 shows another example of a RB allocation with artificial DC subcarrier according to an embodiment of the present invention. Referring to FIG. 22, only 6 subcarriers are shifted for a RB allocation for low cost UE.

(3) This RB allocation difference may occur only for odd system bandwidth case. Since legacy UE and low cost UE may not share the PDCCH, this new allocation for a low cost UE may be acceptable. However, this may cause that more RBs are not schedulable to a legacy UE, as it may not be aligned with RB allocation of low cost UE. For example, side two PRBs (where half PRB is used for center 6 PRBs for 1.4 MHz) may not be usable to schedule a legacy UE.

If subDLBW is created in other location(s) other than the center 1.4 MHz, RB allocation of a low cost UE and RB allocation for a legacy UE, which coexists within a system bandwidth, may be different. Necessary gap of subcarriers to align different allocations may be left up to network implementation. From a UE perspective, if 73 carriers are assumed as a subDLBW size, RB allocation may be [12 subcarriers][12 subcarriers][12 subcarriers][DC][12 subcarriers][12 subcarriers][12 subcarriers]. If 72 carriers are assumed as a subDLBW size, RB allocation may be either [12 subcarriers][12 subcarriers][11 subcarriers][DC][12 subcarriers][12 subcarriers][12 subcarriers] or [12 subcarriers][12 subcarriers][12 subcarriers][DC][11 subcarriers][12 subcarriers][12 subcarriers]. Either approach may have the impact on DM-RS. For example, the second approach is used, DM-RS pattern for antenna ports 7 or 8 may not be able to utilize 4 REs of the 4th PRB as the first subcarrier is punctured. If the first approach is used, DM-RS pattern for antenna ports 9 or 10 may not be able to utilize 4 REs of 3rd PRB as the last subcarrier is punctured.

Another approach to consider is to read more than 1.4 MHz or more than 1.08 MHz for 6 PRBs operation by allowing a wider-band RF capability (1.4 MHz+12 subcarrier (180 KHz)=~1.6 MHz) where baseband can only process 6 PRBs. By reading more PRBs at least for odd system bandwidth, either the lower side of 6 PRBs or the higher side of 6 PRBs may be used for data reception (similarly, this may be applied to UL transmission as well).

FIG. 23 shows another example of a RB allocation with artificial DC subcarrier according to an embodiment of the present invention. Referring to FIG. 23, a wideband is read by RF, and the lower side of 6 PRBs are used for data reception.

FIG. 24 shows another example of a RB allocation with artificial DC subcarrier according to an embodiment of the present invention. Referring to FIG. 24, a wideband is read by RF, and the higher side of 6 PRBs are used for data reception.

The network may signal whether to use the lower side or the higher side of 6 PRBs via PBCH or it may be predetermined. This approach has a drawback that a reduced bandwidth requires to read 7 PRBs, however, this will allow the alignment of PRBs between legacy and low cost UEs. In terms of signal generation, however, the UE may need to interpret this based on system bandwidth. For other subband (not in the center), a similar mechanism may be utilized. This may require reading of system bandwidth via PBCH or other means (e.g. a new PBCH for low cost UE). If increase of RF bandwidth becomes an issue, a UE may read the determined 6 PRBs by skewing the location of DC subcarrier. Or, a UE may use less filtering gap. In other words, the gap between channel bandwidth and transmission bandwidth may become smaller (which however may increase the UE cost).

FIG. 25 shows an example of relationship between channel bandwidth and transmission bandwidth. Referring to FIG. 25, channel bandwidth is configured, and within the channel bandwidth, transmission bandwidth is configured. According to an embodiment of the present invention, the gap between the channel bandwidth and the transmission bandwidth may become smaller.

More generally, to align a subDLBW for a bandwidth reduced UE with PRG and/or RBG, it may be expected that a UE supporting reduced bandwidth reads more than 1.4 MHz from RF perspective. For example, with 100 PRBs system, since RBG size is 4 PRBs, a UE may read up to 12 PRBs (and use the first two RBGs or the last two RBGs), then the waste may be reduced from 6 PRBs to 2 PRBs assuming that a legacy UE cannot be scheduled on partial RBG if a low cost UE in the RBG is scheduled. This problem becomes more severe with PRG since a UE will be scheduled in a PRG unit. For example, with 50 PRBs system bandwidth, PRG size is 3 PRBs. In that case, by reading up to 10 PRBs, a UE may save 3 PRBs waste if only center 6 PRBs are used then 3 PRBs may not be scheduled for DM-RS.

General RB allocation issue for a low cost UE according to an embodiment of the present invention is described. So far, it was assumed that a low cost UE reads 6 PRBs as either [3 PRBs][DC subcarrier][3 PRBs] or [35 subcarriers][DC subcarrier][36 subcarriers] or [36 subcarriers][DC subcarrier][35 subcarriers]. However, an option to align RB boundary between legacy UE and low cost UE may also be considered. In this case, a low cost UE may read [x subcarriers][12 subcarriers][12 subcarriers][y subcarriers][DC subcarrier][12-y-1 subcarriers][12 subcarriers][12 subcarriers][12-x subcarriers] where x and y may be in between [0-12].

In terms of resource allocation, which is assumed to be 6 PRBs, [x subcarriers]+[12-x subcarriers] may form one virtual RB for a low cost UE. For the convenience, a segment index from 0 to 7 may be set where 0 maps to [x subcarriers] and 7 maps [12-x subcarriers] out of 72 subcarriers used for a subDLBW other than a subDLBW in the center. For the subband in the center, the number of subcarriers may be 73.

For a resource allocation (physical resource allocation), the PRB index may start from segment 0 for 12 subcarriers. In case that 72 subcarriers are used for subDLBW, PRB index may start in every 12 subcarriers. If 73 subcarriers are used, PRB allocation may be performed as if a low cost UE is a legacy UE in that system bandwidth.

Thus, RE mapping, from a low cost UE perspective, may be based on physical subcarrier index which is based on the system bandwidth.

This may not be work well with DM-RS based data transmission. If DM-RS based transmission is used, the first and last segment may not be used for data scheduling. In other words, physically adjacent subcarriers may be used as a MTC-PRB if DM-RS based transmission is used.

In this case, if the network wants to keep the same RB for resource allocation, [x subcarriers], if x is not 0 or 12, and [12-x subcarriers] may not be used for any data/control scheduling (as only partial portion of subcarriers in a physical PRB is used for data/control transmission for a low cost UE).

Alternatively, the network may utilize those area to transmit some data, then the remaining [12-x subcarriers] and [x subcarriers] may not be usable for a legacy UE as only partial RB is available for a legacy UE if those are used for scheduling low cost UE. Even with that waste, if the network wants to maintain the same physical PRB allocation for the legacy UE and low cost UE, it may utilize it. If any scheduling for a low cost UE is allowed in those fragmented PRBs, [x subcarriers] and [12-x subcarriers] may be treated as one PRB. In this case, unless x is 12, it maps to the last PRB index (i.e. PRB index 5). In other words, PRB 0 (for a low cost UE) may start at the first segment.

FIG. 26 shows an example of fragmented segments according to an embodiment of the present invention. Referring to FIG. 26, if those segments are used, center 6 PRBs for a low cost UE may be utilized in an ODD system bandwidth network. That is, 6 subcarriers before PRB index 0 and 6 subcarriers after PRB index 6 may be treated as one PRB. In this case, any RS pattern may follow RS pattern based on PRB based on system bandwidth. Thus, RS pattern for a low cost UE, depending on x, may change. For example, if x=6, DM-RS pattern for PRB index 5 may be the same as one PRB. To handle this, a UE may need to know x, and the number of subcarriers used in one subDLBW. When considering DC subcarrier, in addition to avoidance on collision with CRS, avoidance with DM-RS may also be desired.

If this is used, from a low cost UE perspective, RB definition is rather virtual than physical. The UE may need to map the signal mapping by deriving actual REs used for control signal/data scheduling by mapping between virtual RB (based on DC subcarrier location, the number of subcarriers used in a subDLBW) and physical RB based on system bandwidth. If this is used, the UE may need to be informed with system bandwidth.

Furthermore, this option may be used if a low cost UE needs to read both normal and MBSFN subframes. In normal subframe, it may be easier to follow legacy UE PRB. To minimize the impact on UE implementation, subDLBW may also be aligned with PRBs, and in this case, DC subcarrier may be used either first or the last subcarrier of a PRB in the center.

In case of odd system bandwidth, since for center 6 PRBs, it is not possible to align subDLBW to PRBs, a dedicated subDLBW (of 72 subcarriers) may be used instead where MTC-PSS/MTC-SSS are used. In this case, a low cost UE may assume that subDLBW and PRBs based on system bandwidths are always aligned.

The above approach may be more desirable considering that some signals, such as CSI-RS, are shared between legacy UE and low cost UE. If different RB allocation is used between low cost UEs and legacy UEs, the network may configure proper CSI-RS configuration to a low cost UE such that it may be aligned between a legacy UE and low cost UE.

Alternatively, a MTC UE may be configured with a set of REs assumed to be punctured (such as zero-power CSI-RS configuration) and it may not read CSI-RS.

While creating a DC subcarrier, the following additional consideration may also be given. For example, the frequency difference between this DC subcarrier for the subDLBW and the center frequency of the system bandwidth may be multiple of 100 KHz. Alternatively, if subband may carry MTC-PSS/MTC-SSS, it is also desirable to use non-multiple of 100 Khz for the raster of DC subcarrier.

Gap between subDLBW/subULBW according to an embodiment of the present invention is described. To allow flexible operation, it is also reasonable to consider a gap between subDLBWs (and also between subULBWs). The gap size may be changed depending on the location of DC subcarrier and the alignment with PRB allocation for a legacy UE which shares the system bandwidth with low cost UEs. For example, if DC subcarrier is used in subcarrier #2 of PRB #4, only two subcarriers of PRB #1 may be used. However, since the rest 10 subcarriers of PRB #1 may not be schedulable to legacy UEs, the gap may be 10 subcarriers in that case. This flexible gap duration also allows flexible configuration of DC subcarrier within a PRB. In general, up to one PRB may be used for a gap between subDLBWs and/or subULBWs.

If PRBs of a low cost UE and legacy UE are not aligned, the transmission of CSI-RS may become challenging. In this case, either a low cost UE may consider CSI-RS transmission based on legacy UE PRB allocation or may consider that CSI-RS transmission will not occur. Thus, CSI-RS transmission may be treated as interference to a low cost UE. For zero-power CSI-RS, it is up to the network to adjust zero-power CSI-RS configuration aligned with PRBs. If a subDLBW may utilize 73 subcarriers outside of center 6 PRBs, it is difficult to align zero-power CSI-RS. Thus in this case, a UE may assume that zero-power CSI-RS configuration applies only for 72 subcarriers. Or, in this case, it may be assumed that zero-power CSI-RS is not used for a low cost UE.

Considering RB allocation for a low cost UE, it may be desirable to align subDLBW with PRB allocation for a legacy UE, and separate RB allocation for data scheduling and other cell-common RS/channel transmission. For cell-common RS/channel, it may be expected that PRB allocation for a legacy UE is used for a reduced bandwidth UE. For data transmission and scheduling, it may be assumed that 1.4 MHz based PRB allocation for a low cost UE is used. If EPDCCH is used, it may be treated as PDSCH. If PDCCH is used for a low cost UE, the same handling to cell-common channel may be considered. For DM-RS, it may be treated similar to PDSCH. Since PDCCH for a low cost UE is scheduled within a PDSCH region, for PDCCH, RB allocation may follow the rule for PDSCH. For UL, since multiplexing with other legacy UEs are important, PRB allocation for a legacy UE may be used at least for PUCCH/SRS. For PRACH/PUSCH, either option may be considered. If PUCCH/SRS is limited to a subULBW, PUCCH/SRS may also follow 1.4 MHz PRB allocation.

FIG. 27 shows an example of a method for allocating resources to a low cost UE according to an embodiment of the present invention.

In step S100, the BS allocates at least one sub-bandwidth among a system bandwidth to a low cost UE. The BS may further partition the system bandwidth into a plurality of sub-bandwidths. The at least one sub-bandwidth may include a set of resource PRBs that the low cost UE can access at a given subframe. The at least one sub-bandwidth may be located at center of the system bandwidth. The at least one sub-bandwidth may be determined based on a start offset and a number of available sub-bandwidths. The at least one sub-bandwidth may be allocated from a lowest indexed PRBs or from a highest indexed PRBs among available sub-bandwidths. The at least one sub-bandwidth may be aligned with a RBG. The at least one sub-bandwidth may be allocated from PRBs in edge of the system bandwidth. The at least one sub-bandwidth may be overlapped with a center narrowband. The BS may further transmit a synchronization signal via the allocated at least one sub-bandwidth. A size of the one sub-bandwidth may be 72 subcarriers or 73 subcarriers.

In step S110, the BS transmits information on the allocated at least one sub-bandwidth to the low cost UE. The information on the allocated at least one sub-bandwidth may be transmitted via PBCH for the low cost UE, SIB for the low cost UE, a higher layer, MAC CE or DCI. The information on the allocated at least one sub-bandwidth may include an index of the allocated at least one sub-bandwidth. The information on the allocated at least one sub-bandwidth may include a list of the allocated at least one sub-bandwidth.

Further, description of the present invention described above may be applied to the embodiment of FIG. 27.

FIG. 28 shows another example of a method for allocating resources to a low cost UE according to an embodiment of the present invention.

In step S200, the BS allocates resource blocks including a punctured DC subcarrier to a low cost UE. The allocated resource blocks may not be located at center of a set of resource blocks that the low cost UE can access at a given subframe. The given subframe may be a normal subframe or a MBSFN subframe. The puncture DC subcarrier may include REs not used for a PDCCH. A location of the punctured DC subcarrier may be configured based on location of REs used for a CRS. A location of the punctured DC subcarrier may be configured based on a cell ID. A location of the punctured DC subcarrier may be configured by a PBCH, a SIB, or a higher layer signaling. A start symbol of the allocated resource blocks may be indicated via a PBCH, a SIB or a higher layer signaling. The allocated resource blocks may be aligned to a RBG. A CRS RE mapping in the allocated resource blocks may be different or identical between a PDCCH region and a MBSFN region in the allocated resource blocks. A number of subcarriers in the resource blocks including the punctured DC subcarrier may be 73 or 72.

In step S200, the BS communicates with the low cost UE by using the allocated resource blocks. The communicating with the low cost UE by using the allocated resource blocks may comprise transmitting a SIB to the low cost UE by using the allocated resource blocks. In this case, a location of the allocated resource blocks may be fixed.

Further, description of the present invention described above may be applied to the embodiment of FIG. 28.

FIG. 29 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A low cost UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting system information for a narrowband user equipment (UE) in a wireless communication system, the method comprising:

transmitting, by a base station (BS), the system information for the narrowband UE via a first narrowband in a first subfrarme; and transmitting, by the BS, the system information for the narrowband UE via a second narrowband in a second subframe wherein a frequency location of the first narrowband for the narrowband UE is determined by a cell identifier (ID), a system bandwidth, and information related to the first subframe, and wherein a frequency location of the second narrowband for the narrowband UE is determined by the cell ID, the system bandwidth, and information related to a second subframe.

2. The method of claim 1, wherein the system information for the narrowband UE is a system information block type-1 (SIB1) for the narrowband UE.

3. The method of claim 1, wherein the frequency locations of the first narrowband and the second narrowband are determined further based on at least one of a subframe index or a system frame number (SFN).

4. The method of claim 1, wherein each of the first narrowband and second narrowband include six physical resource blocks (PRBs).

5. The method of claim 1, wherein the system information is transmitted via a physical downlink shared channel (PDSCH), and wherein the PDSCH is repeated periodically in every period of specific radio frames.

6. A method for receiving system information in a wireless communication system, the method comprising:

receiving, by a narrowband user equipment (UE) from a base station (BS), the system information via a first narrowband in a first subframe; and receiving, by the narrowband UE from the BS, the system information via a second narrowband in a second subframe wherein a frequency location of the first narrowband for the narrowband UE is determined by a cell identifier (ID), a system bandwidth, and information related to the first subframe, and wherein a frequency location of the second narrowband for the narrowband UE is determined by the cell ID, the system bandwidth, and information related to a second subframe.

7. The method of claim 6, wherein the system information for the narrowband UE is a system information block type-1 (SIB1) for the narrowband UE.

8. The method of claim 6, wherein the frequency locations of the first narrowband and the second narrowband are determined further based on at least one of a subframe index or a system frame number (SFN).

9. The method of claim 6, wherein each of the first narrowband and second narrowband include six physical resource blocks (PRBs).

10. The method of claim 6, wherein the system information is transmitted via a physical downlink shared channel (PDSCH), and wherein the PDSCH is repeated periodically in every period of specific radio frames.

11. A base station (BS) in a wireless communication system, the BS comprising:
a memory;
a transceiver; and
a processor, coupled to the memory and the transceiver, that:
  transmits the system information for the narrowband UE via a first narrowband in a first subfrarme, and
  transmits the system information for the narrowband UE via a second narrowband in a second subframe,
  wherein a frequency location of the first narrowband for the narrowband UE is determined by a cell identifier (ID), a system bandwidth, and information related to the first subframe, and
  wherein a frequency location of the second narrowband for the narrowband UE is determined by the cell ID, the system bandwidth, and information related to a second subframe.

12. The BS of claim 11, wherein the system information for the narrowband UE is a system information block type-1 (SIB1) for the narrowband UE.

13. The BS of claim 11, wherein the frequency locations of the first narrowband and the second narrowband are determined further based on at least one of a subframe index or a system frame number (SFN).

14. The BS of claim 11, wherein each of the first narrowband and second narrowband include six physical resource blocks (PRBs).

15. The BS of claim 11, wherein the system information is transmitted via a physical downlink shared channel (PDSCH), and wherein the PDSCH is repeated periodically in every period of specific radio frames.

* * * * *